(12) United States Patent
Pan et al.

(10) Patent No.: US 10,802,346 B1
(45) Date of Patent: Oct. 13, 2020

(54) DISPLAY PANEL

(71) Applicant: Himax Display, Inc., Tainan (TW)

(72) Inventors: Po-Hung Pan, Tainan (TW); Hua-Hsin Wang, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 16/421,435

(22) Filed: May 23, 2019

(51) Int. Cl.
*G02F 1/1339* (2006.01)
*G02F 1/1333* (2006.01)
*G02F 1/1341* (2006.01)

(52) U.S. Cl.
CPC .......... *G02F 1/1339* (2013.01); *G02F 1/1341* (2013.01); *G02F 1/133308* (2013.01)

(58) Field of Classification Search
CPC . G02F 1/1339; G02F 1/133308; G02F 1/1341
See application file for complete search history.

(56) References Cited

U.S. PATENT DOCUMENTS

| | | | | |
|---|---|---|---|---|
| 2001/0022645 A1* | 9/2001 | Lee | ....................... | G02F 1/1339 349/153 |
| 2001/0055827 A1* | 12/2001 | Asakura | ................ | G02F 1/1339 438/30 |

FOREIGN PATENT DOCUMENTS

| | | | | |
|---|---|---|---|---|
| JP | H0363630 | | 3/1991 | |
| JP | H08179334 | | 7/1996 | |
| JP | H0363630 A | * | 5/1999 | ........... G02F 1/1333 |
| JP | 2000075307 | | 3/2000 | |
| JP | 2006171126 | | 6/2006 | |

OTHER PUBLICATIONS

"Office Action of Taiwan Counterpart Application," dated Mar. 16, 2020, p. 1-p. 7.

* cited by examiner

*Primary Examiner* — Nathanael R Briggs
(74) *Attorney, Agent, or Firm* — JCIPRNET

(57) ABSTRACT

A display panel includes a top substrate, a bottom substrate, a display medium layer disposed between the top substrate and the bottom substrate, and a sealant. The sealant includes a frame portion surrounding a region and the display medium layer distributing in the region, and an injection portion connected to the frame portion. The injection portion has a channel path, an inner opening and an outer opening. The channel path is communicated to the region at the inner opening, and the outer opening is at a distal end of the channel path away from the region. The injection portion includes a first wall, a second wall, and a third wall. The first wall is spaced from the second wall at a first direction to form the outer opening. The third wall is spaced from the second wall at a second direction and shields the outer opening.

19 Claims, 12 Drawing Sheets

DISPLAY PANEL

BACKGROUND

Technical Field

The present invention generally relates to an electronic device, in particular, to a display panel.

Description of Related Art

In a liquid crystal display panel, a bonding material (usually referred to as sealant) is disposed between a top substrate and a bottom substrate to form a planar cavity. The bonding material is frame-like with an opening for a vacuum injection process. In the vacuum injection process, liquid crystal molecules are introduced into the planar cavity through the opening when the planar cavity is subjected to a high vacuum. Once the planar cavity is filled with the liquid crystal molecules, the opening must be sealed by means of a plug material (usually referred to as end-seal). The interaction between the end-seal and the liquid crystal molecules however disorientates the liquid crystal molecules, and the so-called end-seal mura occurs. The existence of end-seal mura in a display region of the liquid crystal display panel would seriously detract from display quality.

SUMMARY

Accordingly, the present invention is directed to a display panel that will either eliminate or substantially reduce the end-seal mura in the display region of the liquid crystal display panel.

According to an embodiment, a display panel includes a top substrate, a bottom substrate, a display medium layer disposed between the top substrate and the bottom substrate, and a sealant. The sealant includes a frame portion surrounding a region and the display medium layer distributing in the region, and an injection portion connected to the frame portion. The injection portion has a channel path, an inner opening and an outer opening. The channel path is communicated to the region at the inner opening, and the outer opening is at a distal end of the channel path away from the region. The injection portion includes a first wall, a second wall and a third wall. The first wall is spaced from the second wall at a first direction to form the outer opening. The third wall is spaced from the second wall at a second direction and shields the outer opening. The first direction is intersected with the second direction.

According to the embodiments of the disclosure, the channel path of the injection portion of the sealant is bent so as to elongate its effective length. Compared to the effective length of the channel path of the injection portion, the end-seal extends in the channel path for a relatively short length and close the outer opening of the channel path. Therefore, the material of the display medium layer interacting with the uncured material of the end-seal may be restricted in the channel path defined by the injection portion. Without the influence of the end-seal, the liquid crystal molecules spread in the display region can mostly orient well. This eliminates or substantially reduces the end-seal mura of the display panel, thereby improving the quality of the display panel.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

Each of FIGS. 2 to 21 schematically illustrates a top view of an injection portion of the sealant in a display panel in accordance with an embodiment of the present disclosure.

DESCRIPTION OF THE EMBODIMENTS

Figure 1A:
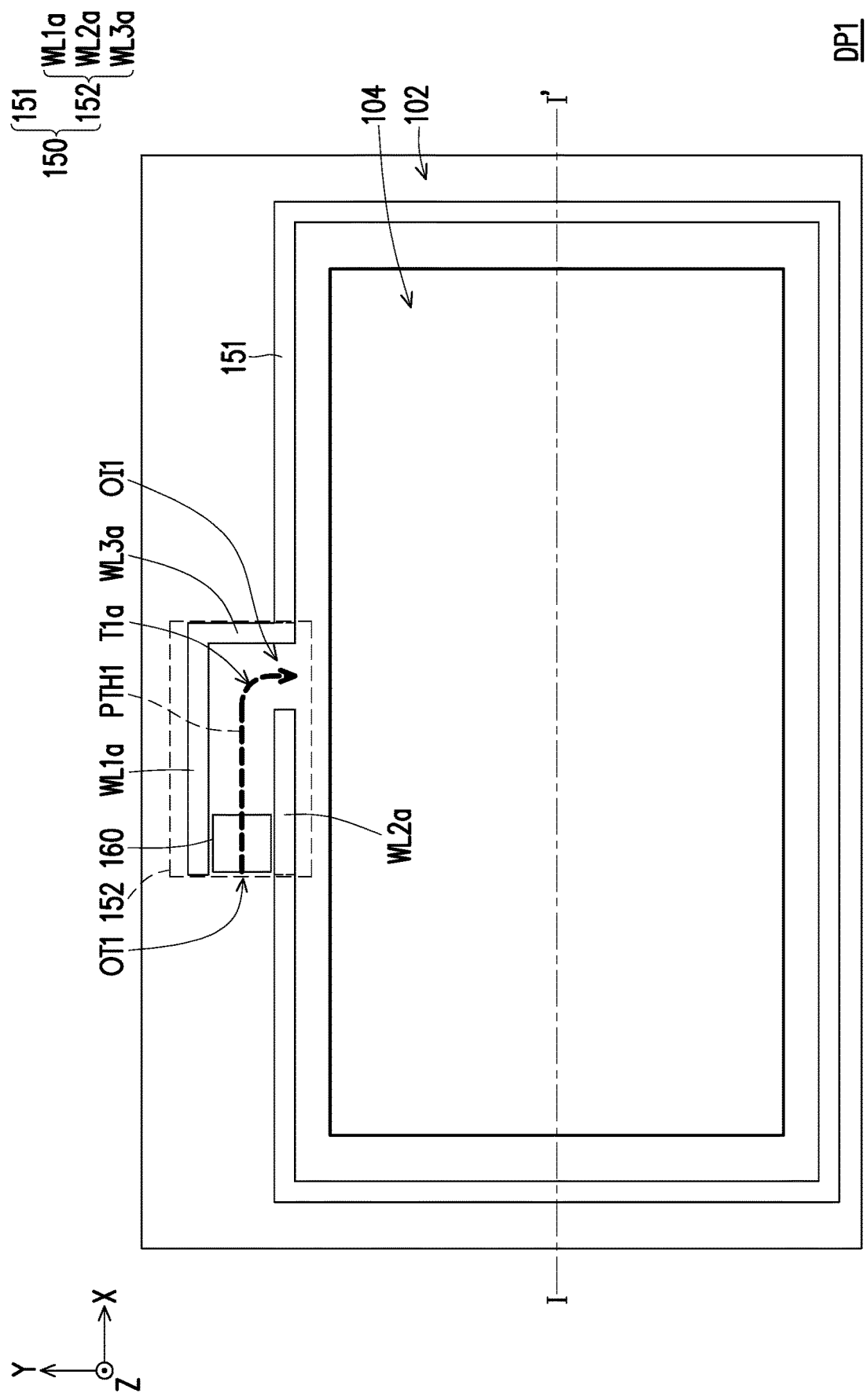
FIG. 1A schematically illustrates a top view of a display panel in accordance with an embodiment of the present disclosure.
Figure 1B:
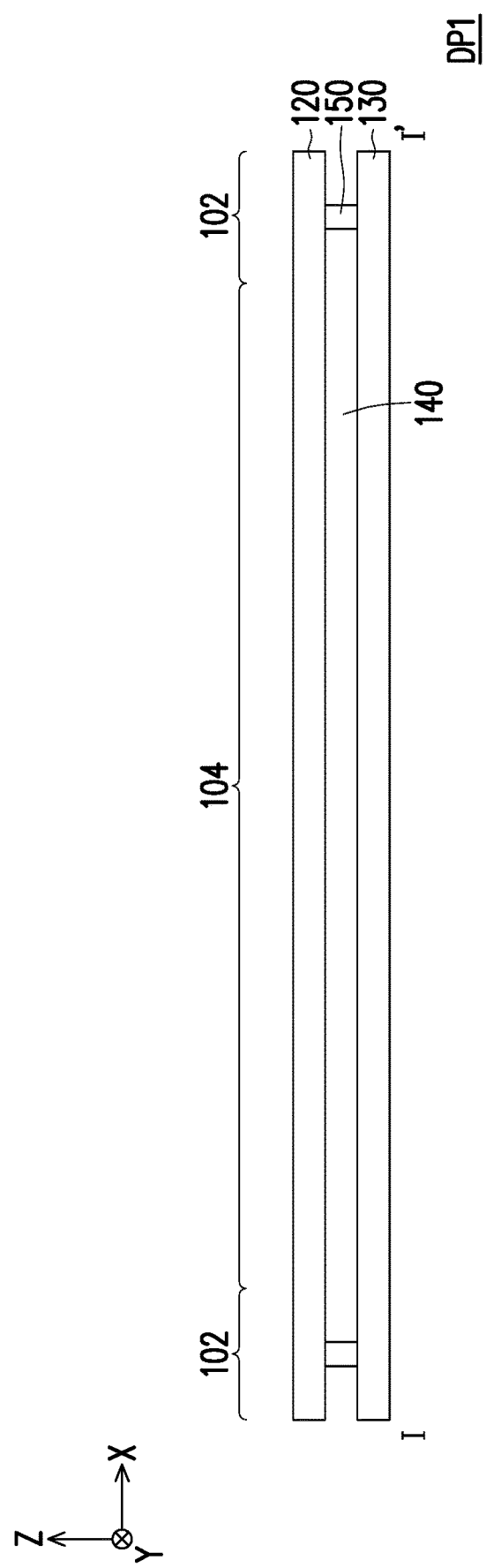
FIG. 1B is a schematic cross-sectional view along a cross-sectional line I-I' of FIG. 1A.

FIG. 1A schematically illustrates a top view of a display panel in accordance with an embodiment of the present disclosure. FIG. 1B is a schematic cross-sectional view along a cross-sectional line I-I' of FIG. 1A. Referring to FIG. 1A and FIG. 1B, the display panel DP1 has a first region 102 and a second region 104. As viewed from above, the first region 102 has a frame-like pattern and encloses the second region 104. The first region 102 serves as the non-display region. In some embodiments, the first region 102 may be known as a region where a light shielding layer (not shown) exists. Besides, images are rendered and presented in the second region 104 so that the second region 104 serves as the display region.

The display panel DP1 includes a top substrate 120, a bottom substrate 130, a display medium layer 140, a sealant 150 and an end-seal 160. The top substrate 120 and the bottom substrate 130 are arranged opposite to each other and the sealant 150 is disposed between the top substrate 120 and the bottom substrate 130. The top substrate 120 and the bottom substrate 130 are bonded together with the sealant 150. The sealant 150 is of uniform thickness so that the top substrate 120 and the bottom substrate 130 are spaced evenly apart. The display medium layer 140, which mainly distributes in first region 102, is disposed between the top substrate 120 and the bottom substrate 130. The display medium layer 140 is enclosed by the top substrate 120, the bottom substrate 130, the sealant 150, and the end-seal 160.

The sealant 150 includes a frame portion 151 and an injection portion 152. The frame portion 151 located in the first region 102 surrounds the second region 104. The frame portion 151 has a frame-like shape and basically extends around the entire periphery of the display panel DP1. The frame portion 151 has two ends opposite to each other and the injection portion 152 is connected to the two opposite ends of the frame portion 151. The injection portion 152 has a channel path PTH1, an inner opening OI1 and an outer opening OT1. The channel path PTH1 is communicated to the second region 104 at the inner opening OI1. The outer opening OT1 is at a distal end of the channel path PTH1 away from the second region 104. The inner opening OI1 and the outer opening OT1 have sufficient size allowing the material of the display medium layer 140 to flow through the channel path PTH1 and into the second region 104 during the vacuum injection process. In the embodiment, the material of the display medium layer 140 may include liquid crystal molecules.

The injection portion 152 includes a first wall WL1a, a second wall WL2a, and a third wall WL3a. The first wall WL1a is spaced from the second wall WL2a at a first direction, for example, the Y direction, to form the outer opening OT1. Namely, the outer opening OT1 is defined by an end of the first wall WL1a and an end of the second wall WL2a. The third wall WL3a, which shields the outer opening OT1, is spaced from the second wall WL2a at a second direction, for example, the X direction, to form the inner opening OI1. Namely, the inner opening OI1 is defined by an end of the third wall WL3a and an end of the second wall WL2a. The third wall WL3a is situated behind the outer opening OT1 but not closing the outer opening OT1 off from communication with the second region 104 via the channel path PTH1. The boundary of the injection portion 152 is defined by a first wall WL1a, a second wall WL2a, and a third wall WL3a.

The first wall WL1a is intersected with the third wall WL3a to form a first turn T1a of the channel path PTH1. The third wall WL3a is connected between the first wall WL1a and one end of the frame portion 151. The second wall WL2a connected to the other end of the frame portion 151 is parallel to the first wall WL1a. Although the first wall WL1a, the second wall WL2a, and the third wall WL3a are straight respectively, together they constitute the channel path PTH1 of L-shaped geometry. Because the channel path PTH1 is bent, its effective length is elongated. Compared to the effective length of the channel path PTH1 of the injection portion 152, the end-seal 160 extends in the channel path PTH1 for a relatively short length and closes the outer opening OT1 of the channel path PTH1. Therefore, the material of the display medium layer 140 interacting with the uncured material of the end-seal 160 may be restricted in the channel path PTH1 defined by the injection portion 152.

To fabricate the display panel DP1, the material of the display medium layer 140 are introduced into a planar cavity defined by the top substrate 120, the bottom substrate 130, and the sealant 150 through the outer opening OT1 in a vacuum injection process. Once the planar cavity is filled with the material of the display medium layer 140, such as liquid crystal molecules, the outer opening OT1 is sealed by means of the end-seal 160. As set forth above, the liquid crystal molecules distributed in the injection portion 152 may interact with the uncured material of the end-seal 160, while the liquid crystal molecules distributed in the second region 104 do not. Without the influence of the end-seal 160, the liquid crystal molecules spread in the second region 104 can mostly orient well. This eliminates or substantially reduces the end-seal mura of the display panel DP1, thereby ensuring display quality.

The sealant 150 is generally made of light curable materials or thermal curable materials. The sealant 150 may be dispensed onto the top substrate 120 or the bottom substrate 130 by a dispenser or be printed by screen printing. To cure the sealant 150, the top substrate 120 is preferably transparent to allow light to penetrate therethrough. Typically, the material of the top substrate 120 may be glass, quartz, or the like. The display panel DP1 may further include an electrode layer (not shown) disposed between the top substrate 120 and the display medium layer 140. Although the bottom substrate 130 is presented as a plate-like structure in FIG. 1B, the bottom substrate 130 may be a transistor array substrate, which includes a support substrate and a transistor array. The support substrate may be, for example but not limited thereto, a glass plate, or a silicon backplane. The transistor array may be, for example but not limited thereto, a thin film transistor array or a CMOS (Complementary Metal-Oxide Semiconductor) device array. The transistor array (not shown) and the electrode layer may be used to provide electric field to drive and realign the display medium layer 140. The material of the display medium layer 140 may be liquid crystal so that the top substrate 120, the bottom substrate 130, the display medium layer 140, the sealant 150, and the end-seal 160 may serve as a liquid crystal cell. In some embodiments, the display panel DP1 may be a Thin Film Transistor Liquid Crystal Display (TFT-LCD) panel or an LCoS (Liquid Crystal on Silicon) display panel.

In FIG. 1A, the first direction, the Y direction, is intersected with the second direction, the X direction. In some embodiments, the first direction and the second direction are perpendicular to each other. In some embodiments, the first wall WL1a and the second wall WL2a in FIG. 1A are extended along one of the X direction and the Y direction, and the third wall WL3a is extended along the other of the X direction and the Y direction. In other embodiments, the first wall, the second wall and the third wall may be tilted with respect to either the Y direction or the X direction. In other embodiments, at least one of the first wall, the second wall and the third wall is inclined from either the X direction or the Y direction. In other embodiments, the angle between the first wall and the third wall is either an obtuse angle or an acute angle. The outer opening OT1 spans in the first direction, the Y direction, and the inner opening OH spans in the second direction, the X direction.

In FIG. 1A, the channel path PTH1 has a labyrinth-like structure. The exact structure of the channel path PTH1 may vary according to different design consideration. For example, Each of FIGS. 2 to 21 schematically illustrates a top view of an injection portion of the sealant in a display panel in accordance with an embodiment of the present disclosure. To clarify the modifications between embodiments about to be mentioned and the aforementioned embodiments, the same reference numerals and notations denote the same components in the following description, and similar parts are not detailed redundantly.

Figure 2:
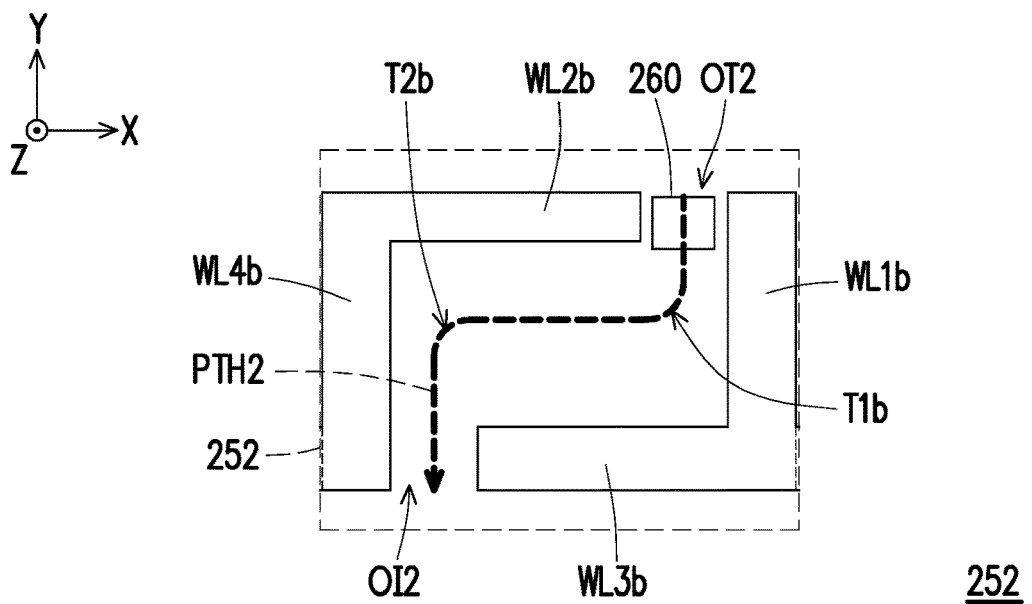

Specifically, an injection portion 252 shown in FIG. 2 may replace the injection portion 152 shown in FIG. 1A. As shown in FIG. 2, the injection portion 252 includes a first wall WL1b, a second wall WL2b, a third wall WL3b, and a fourth wall WL4b. The first wall WL1b is spaced from the second wall WL2b at a first direction, for example, the X direction, to form an outer opening OT2. The third wall WL3b, which shields the outer opening OT2, is spaced from the second wall WL2b at a second direction, for example, the Y direction. The third wall WL3b is spaced from the frame portion 151 and the fourth wall WL4b at the first direction to form an inner opening OI2.

The first wall WL1b is parallel to the fourth wall WL4b. The second wall WL2b is parallel to the third wall WL3b. The first wall WL1b and the third wall WL3b are connected to one end of the frame portion 151. The third wall WL3b is connected to an end of the first wall WL1b. The fourth wall WL4b is connected between the second wall WL2b and the other end of the frame portion 151. An extension direction of the first wall WL1b is intersected with an extension of the second wall WL2b and the outer opening OT2 is formed between an end of the first wall WL1b and an end of the second wall WL2b. The second wall WL2b shields the inner opening OI2.

A channel path PTH2 is defined by the first wall WL1b, the second wall WL2b, the third wall WL3b, and the fourth wall WL4b. Although the first wall WL1b, the second wall WL2b, the third wall WL3b, and the fourth wall WL4b are straight respectively, together they constitute the channel path PTH2 of bent geometry. The first wall WL1b is intersected with the third wall WL3b to form a first turn T1b of a channel path PTH2. The fourth wall WL4b is intersected with the second wall WL2b to form a second turn T2b of the channel path PTH2. Because the channel path PTH2 is bent, the effective length of the channel path PTH2 is essentially elongated and the end-seal 260 extends a relatively short length in the channel path PTH2. When the injection portion 252 is applied to the display panel DP1 shown in FIG. 1A and FIG. 1B, the material of the display medium layer 140 that may interact with the uncured material of the end-seal 260 is restricted in the injection portion 252 and the material of the display medium layer 140 spread in the second region 104 can mostly orient well. This eliminates or substantially reduces the end-seal mura of the display panel DP1, thereby ensuring display quality.

Figure 3:
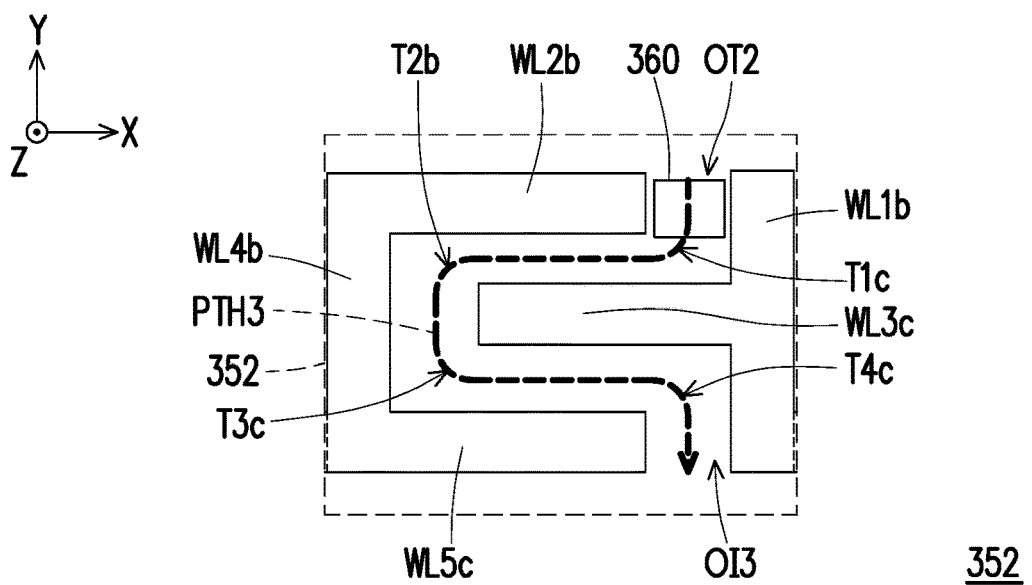

An injection portion 352 shown in FIG. 3 is another exemplary alternative for replacing the injection portion 152 shown in FIG. 1A. As shown in FIG. 3, the injection portion 352 includes the first wall WL1b, the second wall WL2b, a third wall WL3c, the fourth wall WL4b, and a fifth wall WL5c. Herein, the first wall WL1b, the second wall WL2b and the fourth wall WL4b of the injection portion 352 may be arranged in a similar manner as the first wall WL1b, the second wall WL2b and the fourth wall WL4b of the injection portion 252 so that the same reference numbers are used for indicating the similar components. The first wall WL1b is spaced from the second wall WL2b at the first direction, the X direction, to form the outer opening OT2. The third wall WL3c, which shields the outer opening OT2, is spaced from the second wall WL2b at the second direction, the Y direction. The fifth wall WL5c is spaced from the frame portion 151 and the first wall WL1b at the first direction to form an inner opening OI3.

The first wall WL1b is parallel to the fourth wall WL4b. The second wall WL2b is parallel to the third wall WL3c and the fifth wall WL5c. The third wall WL3b is connected to a point of the first wall WL1b and the point is positioned between two opposite ends of the first wall WL1b. The fourth wall WL4b and the fifth wall WL5c are connected to one end of the frame portion 151. An extension direction of the first wall WL1b is intersected with an extension of the second wall WL2b and the outer opening OT2 is formed between an end of the first wall WL1b and an end of the second wall WL2b.

In the embodiment, a channel path PTH3 defined by the injection portion 352 is twisted counterclockwise. The boundary of the injection portion 352 is defined by the first wall WL1b, the second wall WL2b and the third wall WL3c, and the fourth wall WL4b. Although the first wall WL1b, the second wall WL2b, the third wall WL3c, the fourth wall WL4b, and the fifth wall WL5c are straight respectively, together they constitute the channel path PTH3 of bent geometry. The first wall WL1b is intersected with the third wall WL3c to form a first turn T1c of the channel path PTH3. The fourth wall WL4b is intersected with the second wall WL2b to form the second turn T2b of the channel path PTH3. The fourth wall WL4b is intersected with the fifth wall WL5c to form the third turn T3c of the channel path PTH3. The first wall WL1b is intersected with the third wall WL3c to form a T shape so that a four turn T4c of the channel path PTH3 is defined at a side of the third wall WL3c opposite to the first turn T1c. Because the channel path PTH3 is bent, the effective length of the channel path PTH3 is essentially elongated and the end-seal 360 extends a relatively short length in the channel path PTH3. When the injection portion 352 is applied to the display panel DP1 shown in FIG. 1A and FIG. 1B, the material of the display medium layer 140 that may interact with the uncured material of the end-seal 360 is restricted in the injection portion 352 and the material of the display medium layer 140 spread in the second region 104 can mostly orient well. This eliminates or substantially reduces the end-seal mura of the display panel DP1, thereby ensuring display quality.

Figure 4:
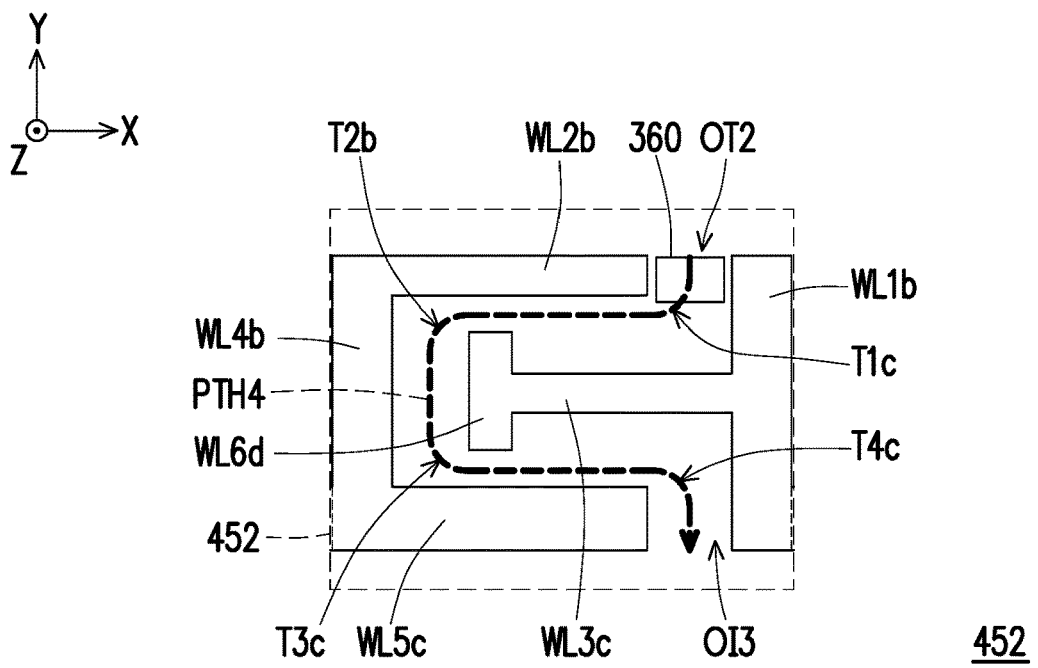

An injection portion 452 shown in FIG. 4 is another exemplary alternative for replacing the injection portion 152 shown in FIG. 1A. As shown in FIG. 4, the injection portion 452, similar to the injection portion 352 in FIG. 3, includes the first wall WL1b, the second wall WL2b, a third wall WL3c, the fourth wall WL4b, and the fifth wall WL5c and further includes a sixth wall WL6d. The sixth wall WL6d is parallel to the first wall WL1b and the fourth wall WL4b. The third wall WL3c is connected to a point of the first wall WL1b and the point is positioned between two opposite ends of the first wall WL1b. The third wall WL3c is connected to a point of the sixth wall WL6d and the point is positioned between two opposite ends of the sixth wall WL6d.

In the embodiment, a channel path PTH4 defined by the injection portion 452 is twisted counterclockwise. The boundary of the injection portion 452 is defined by the first wall WL1b, the second wall WL2b and the third wall WL3c, and the fourth wall WL4b. Although the first wall WL1b through the sixth wall WL6d are straight respectively, together they constitute the channel path PTH4 of bent geometry. The first wall WL1b is intersected with the third wall WL3c to form a first turn T1c of the channel path PTH4. The fourth wall WL4b is intersected with the second wall WL2b to form the second turn T2b of the channel path PTH4. The fourth wall WL4b is intersected with the fifth wall WL5c to form the third turn T3c of the channel path PTH4. The first wall WL1b is intersected with the third wall WL3c to form a T shape so that a fourth turn T4c of the channel path PTH3 is defined at a side of the third wall WL3c opposite to the first turn T1c. Because the channel path PTH4 is bent, the effective length of the channel path PTH4 is essentially elongated and the end-seal 360 extends a relatively short length in the channel path PTH4. When the injection portion 452 is applied to the display panel DP1 shown in FIG. 1A and FIG. 1B, the material of the display medium layer 140 that may interact with the material of the uncured end-seal 360 is restricted in the injection portion 452 and the material of the display medium layer 140 spread in the second region 104 can mostly orient well. This eliminates or substantially reduces the end-seal mura of the display panel DP1, thereby ensuring display quality.

Figure 5:
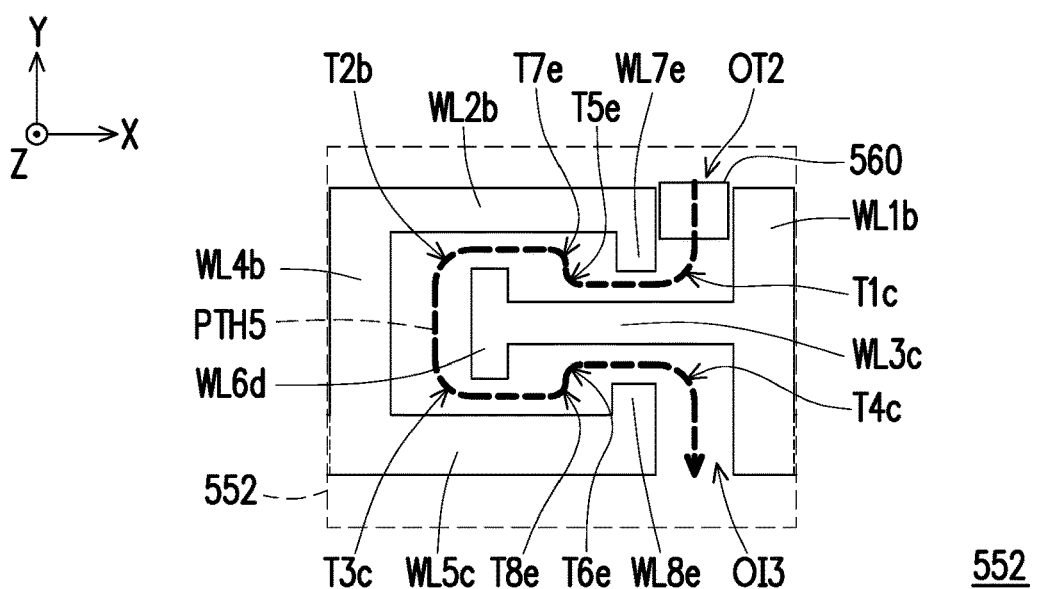

An injection portion 552 shown in FIG. 5 is another exemplary alternative for replacing the injection portion 152 shown in FIG. 1A. As shown in FIG. 5, the injection portion 552, similar to the injection portion 452 in FIG. 4, includes the first wall WL1b, the second wall WL2b, a third wall WL3c, the fourth wall WL4b, the fifth wall WL5c, and the sixth wall WL6d and further includes a seventh wall WL7e and an eighth wall WL8e. The seventh wall WL7e and the eighth wall WL8e are parallel to the first wall WL1b, the fourth wall WL4b, and the sixth wall WL6d. The seventh wall WL7e and the eighth wall WL8e are connected to the second wall WL2b and the fifth wall WL5c respectively.

The boundary of the injection portion 552 defining a channel path PTH5 is defined by the first wall WL1b, the second wall WL2b and the third wall WL3c, and the fourth wall WL4b. Although the first wall WL1b through the eighth wall WL8e are straight respectively, together they constitute the channel path PTH5 of bent geometry. The first wall WL1b is intersected with the third wall WL3c to form the first turn T1c of a channel path PTH5. The fourth wall WL4b is intersected with the second wall WL2b to form the second turn T2b of the channel path PTH5. The fourth wall WL4b is intersected with the fifth wall WL5c to form the third turn T3c of the channel path PTH5. The first wall WL1b is intersected with the third wall WL3c to form a T shape so that a four turn T4c of the channel path PTH3 is defined at a side of the third wall WL3c opposite to the first turn T1c. The sixth wall WL6d is intersected with the third wall WL3c to form a fifth turn T5e and a sixth turn T6e of the channel path PTH5. The seventh wall WL7e and the eighth wall WL8e are intersected with the second wall WL2b and the fifth wall WL5c respectively to form a seventh turn T7e and an eighth turn T8e of the channel path PTH5. Because the channel path PTH5 is bent, the effective length of the channel path PTH5 is essentially elongated and the end-seal 560 extends a relatively short length in the channel path PTH5. When the injection portion 552 is applied to the display panel DP1 shown in FIG. 1A and FIG. 1B, the material of the display medium layer 140 that may interact with the material of the uncured end-seal 560 is restricted in the injection portion 552 and the material of the display medium layer 140 spread in the second region 104 can mostly orient well. This eliminates or substantially reduces the end-seal mura of the display panel DP1, thereby ensuring display quality.

Figure 6:
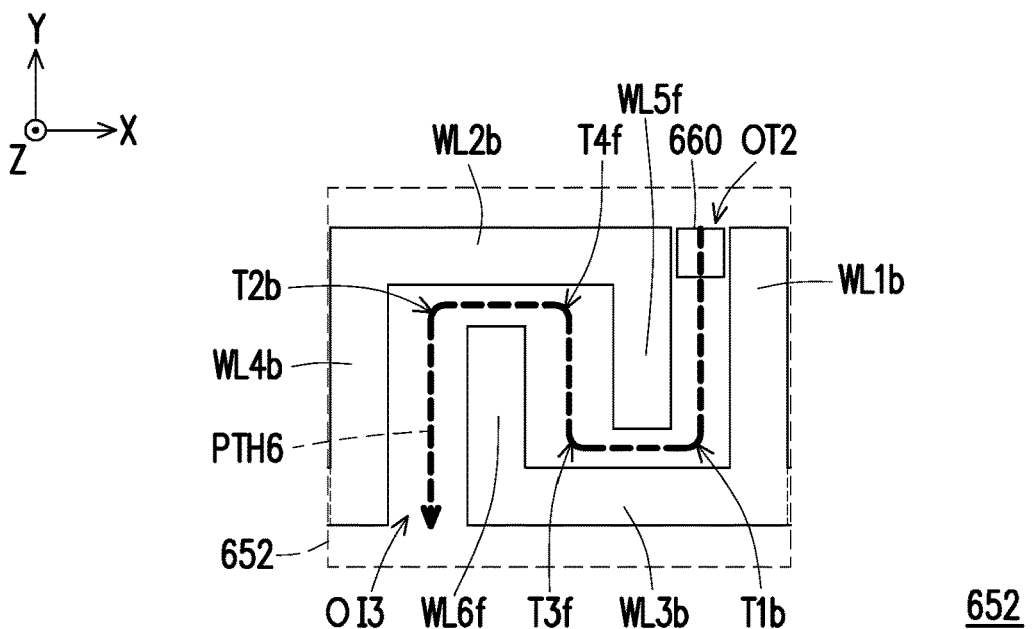

An injection portion 652 shown in FIG. 6 is another exemplary alternative for replacing the injection portion 152 shown in FIG. 1A. As shown in FIG. 6, the injection portion 652, similar to the injection portion 252 in FIG. 2, includes the first wall WL1b, the second wall WL2b, the third wall WL3b, and the fourth wall WL4b and further includes a fifth wall WL5f, and a sixth wall WL6f. The first wall WL1b is spaced from the second wall WL2b at the first direction to form the outer opening OT2. The third wall WL3b, which shields the outer opening OT2, is spaced from the second wall WL2b at the second direction. The third wall WL3b is spaced from the frame portion 151 and the fourth wall WL4b at the first direction to form an inner opening OI3. The first wall WL1b is parallel to the fourth wall WL4b, the fifth wall WL5f, and the sixth wall WL6f. The second wall WL2b is parallel to the third wall WL3b. The second wall WL2b is connected between the fourth wall WL4b and the fifth wall WL5f. The third wall WL3b is connected between the first wall WL1b and the sixth wall WL6f.

In the embodiment, a channel path PTH6 defined by the injection portion 652 is alternate clockwise and counter-clockwise twisted. The boundary of the injection portion 652 is defined by the first wall WL1b, the second wall WL2b and the third wall WL3b, and the fourth wall WL4b. Although the first wall WL1b through the sixth wall WL6f are straight respectively, together they constitute the channel path PTH6 of bent geometry. The first wall WL1b is intersected with the third wall WL3b to form a first turn T1b of the channel path PTH6. The fourth wall WL4b is intersected with the second wall WL2b to form the second turn T2b of the channel path PTH6. The third wall WL3b is intersected with the sixth wall WL6f to form the third turn T3f of the channel path PTH6. The second wall WL2b is intersected with the fifth wall WL5f to form the fourth turn T4f of the channel path PTH6. Because the channel path PTH6 is bent, the effective length of the channel path PTH6 is essentially elongated and the end-seal 660 extends a relatively short length in the channel path PTH6. When the injection portion 652 is applied to the display panel DP1 shown in FIG. 1A and FIG. 1B, the material of the display medium layer 140 that may interact with the material of the uncured end-seal 660 is restricted in the injection portion 652 and the material of the display medium layer 140 spread in the second region 104 can mostly orient well. This eliminates or substantially reduces the end-seal mura of the display panel DP1, thereby ensuring display quality.

Figure 7:
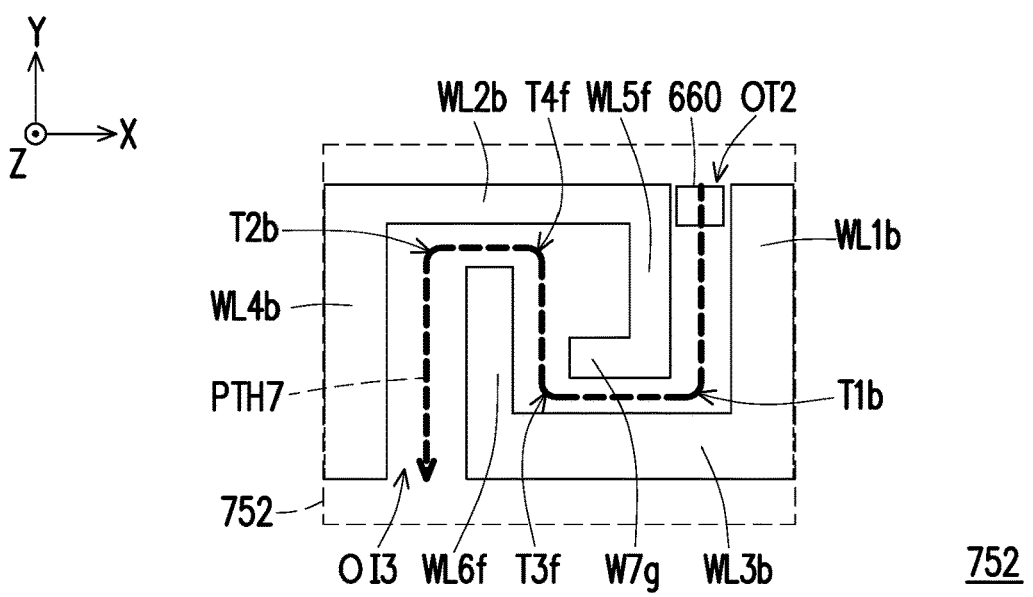

An injection portion 752 shown in FIG. 7 is another exemplary alternative for replacing the injection portion 152 shown in FIG. 1A. As shown in FIG. 7, the injection portion 752, similar to the injection portion 652 in FIG. 6, includes the first wall WL1b, the second wall WL2b, the third wall WL3b, the fourth wall WL4b, and the fifth wall WL5f and further includes a seventh wall WL7g. The second wall WL2b is parallel to the third wall WL3b and the seventh wall WL7g. The seventh wall WL7g is connected to the fifth wall WL5f.

The boundary of the injection portion 752 defining a channel path PTH7 is defined by the first wall WL1b, the second wall WL2b and the third wall WL3b, and the fourth wall WL4b. Although the first wall WL1b through the seventh wall WL7g are straight respectively, together they constitute the channel path PTH7 of bent geometry. The first wall WL1b is intersected with the third wall WL3b to form a first turn T1b of the channel path PTH7. The fourth wall WL4b is intersected with the second wall WL2b to form the second turn T2b of the channel path PTH7. The third wall WL3b is intersected with the sixth wall WL6f to form the third turn T3f of the channel path PTH7. The second wall WL2b is intersected with the fifth wall WL5f to form the fourth turn T4f of the channel path PTH7. Because the channel path PTH7 is bent, the effective length of the channel path PTH7 is essentially elongated and the end-seal 760 extends a relatively short length in the channel path PTH7. When the injection portion 752 is applied to the display panel DP1 shown in FIG. 1A and FIG. 1B, the material of the display medium layer 140 that may interact with the material of the uncured end-seal 760 is restricted in the injection portion 752 and the material of the display medium layer 140 spread in the second region 104 can mostly orient well. This eliminates or substantially reduces the end-seal mura of the display panel DP1, thereby ensuring display quality.

Figure 8:
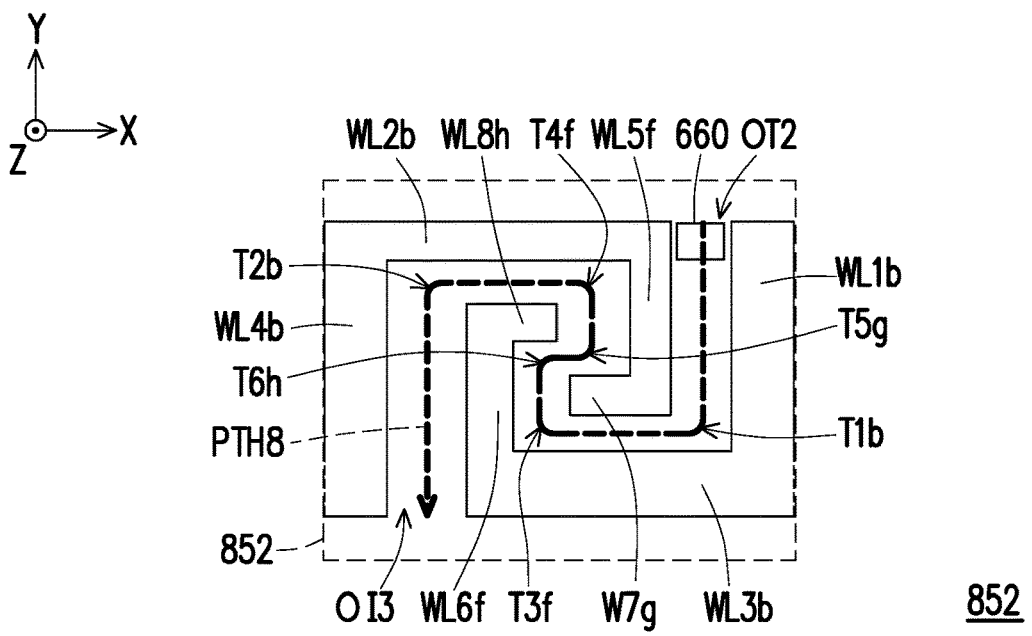

An injection portion 852 shown in FIG. 8 is another exemplary alternative for replacing the injection portion 152 shown in FIG. 1A. As shown in FIG. 8, the injection portion 852, similar to the injection portion 652 in FIG. 6, includes the first wall WL1b, the second wall WL2b, the third wall WL3b, the fourth wall WL4b, the fifth wall WL5f, and the seventh wall WL7g and further includes an eighth wall WL8h. The second wall WL2b is parallel to the third wall WL3b, the seventh wall WL7g, and the eighth wall WL8h. The eighth wall WL8h is connected to the sixth wall WL6f.

In the embodiment, a channel path PTH8 of the injection portion 852 is alternate clockwise and counterclockwise twisted. The boundary of the injection portion 852 is defined by the first wall WL1b, the second wall WL2b and the third wall WL3b, and the fourth wall WL4b. Although the first wall WL1b through the eighth wall WL8h are straight respectively, together they constitute the channel path PTH8 of bent geometry. The first wall WL1b is intersected with the third wall WL3b to form a first turn T1b of the channel path PTH8. The fourth wall WL4b is intersected with the second wall WL2b to form the second turn T2b of the channel path PTH8. The third wall WL3b is intersected with the sixth wall WL6f to form the third turn T3f of the channel path PTH8. The second wall WL2b is intersected with the fifth wall WL5f to form the fourth turn T4f of the channel path PTH8. The seventh wall WL7g is intersected with the fifth wall WL5f to form the fifth turn T5g of the channel path PTH8.

The eighth wall WL8*h* is intersected with the sixth wall WL6*f* to form the sixth turn T6*h* of the channel path PTH8. Because the channel path PTH8 is bent, the effective length of the channel path PTH8 is essentially elongated and the end-seal 660 extends a relatively short length in the channel path PTH8. When the injection portion 852 is applied to the display panel DP1 shown in FIG. 1A and FIG. 1B, the material of the display medium layer 140 that may interact with the material of the uncured end-seal 660 is restricted in the injection portion 852 and the material of the display medium layer 140 spread in the second region 104 can mostly orient well. This eliminates or substantially reduces the end-seal mura of the display panel DP1, thereby ensuring display quality.

Figure 9:
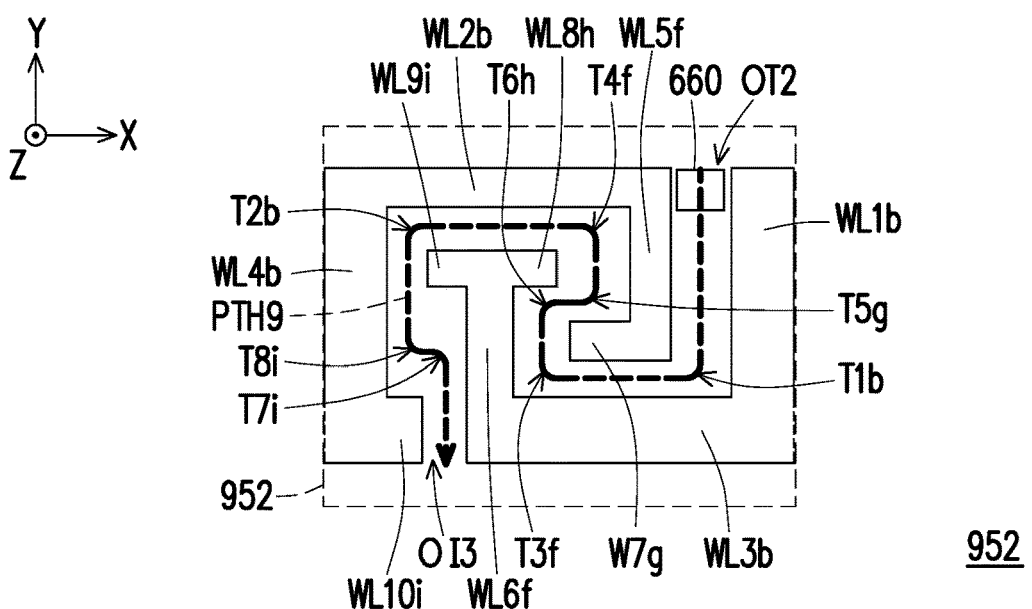

An injection portion 952 shown in FIG. 9 is another exemplary alternative for replacing the injection portion 152 shown in FIG. 1A. As shown in FIG. 9, the injection portion 952, similar to the injection portion 852 in FIG. 8, includes the first wall WL1*b*, the second wall WL2*b*, the third wall WL3*b*, the fourth wall WL4*b*, the fifth wall WL5*f*, the seventh wall WL7*g*, and the eighth wall WL8*h* and further includes a ninth wall WL9*i* and a tenth wall WL10*i*. The second wall WL2*b* is parallel to the third wall WL3*b*, the seventh wall WL7*g*, the eighth wall WL8*h*, the ninth wall WL9*i*, and the tenth wall WL10*i*. The ninth wall WL9*i* is connected to the sixth wall WL6*f* and the eighth wall WL8*h*. The tenth wall WL10*i* is connected to the fourth wall WL4*b* and one end of the frame portion 151.

The boundary of the injection portion 952 defining a channel path PTH9 is defined by the first wall WL1*b*, the second wall WL2*b* and the third wall WL3*b*, and the fourth wall WL4*b*. Although the first wall WL1*b* through the tenth wall WL10*i* are straight respectively, together they constitute the channel path PTH9 of bent geometry. The first wall WL1*b* is intersected with the third wall WL3*b* to form a first turn T1*b* of the channel path PTH9. The fourth wall WL4*b* is intersected with the second wall WL2*b* to form the second turn T2*b* of the channel path PTH9. The third wall WL3*b* is intersected with the sixth wall WL6*f* to form the third turn T3*f* of the channel path PTH9. The second wall WL2*b* is intersected with the fifth wall WL5*f* to form the fourth turn T4*f* of the channel path PTH9. The seventh wall WL7*g* is intersected with the fifth wall WL5*f* to form the fifth turn T5*g* of the channel path PTH9. The eighth wall WL8*h* is intersected with the sixth wall WL6*f* to form the sixth turn T6*h* of the channel path PTH9. The ninth wall WL9*i* is intersected with the sixth wall WL6*f* to form the seventh turn T7*i* of the channel path PTH9. The tenth wall WL10*i* is intersected with the fourth wall WL4*b* to form the eighth turn T8*i* of the channel path PTH9. Because the channel path PTH9 is bent, the effective length of the channel path PTH9 is essentially elongated and the end-seal 660 extends a relatively short length in the channel path PTH9. When the injection portion 952 is applied to the display panel DP1 shown in FIG. 1A and FIG. 1B, the material of the display medium layer 140 that may interact with the material of the uncured end-seal 660 is restricted in the injection portion 952 and the material of the display medium layer 140 spread in the second region 104 can mostly orient well. This eliminates or substantially reduces the end-seal mura of the display panel DP1, thereby ensuring display quality.

Figure 10:
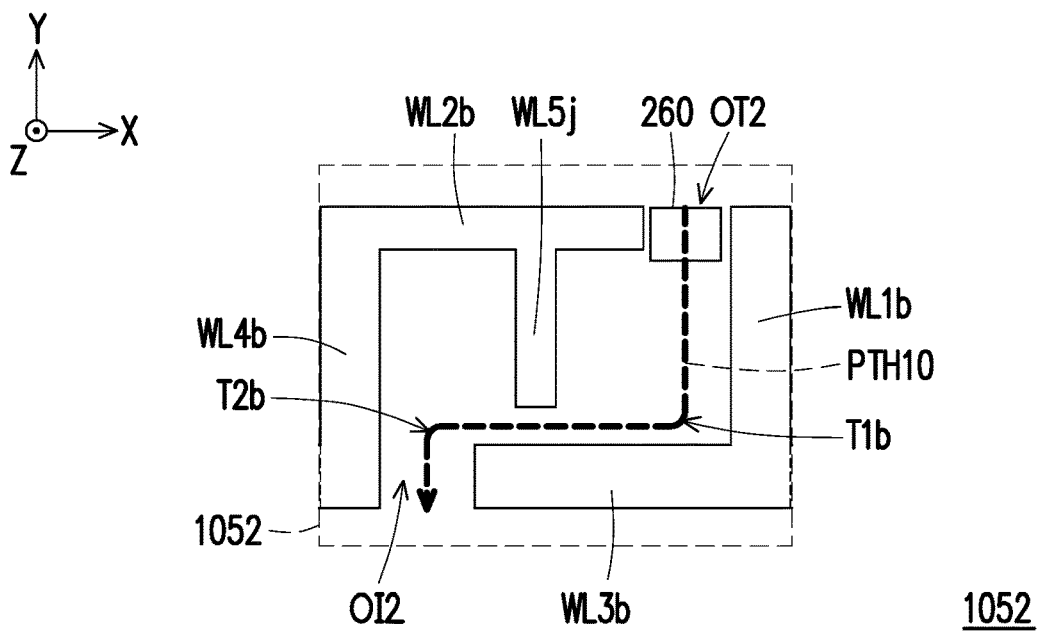

An injection portion 1052 shown in FIG. 10 is another exemplary alternative for replacing the injection portion 152 shown in FIG. 1A. As shown in FIG. 10, the injection portion 1052, similar to the injection portion 252 in FIG. 2, includes the first wall WL1*b*, the second wall WL2*b*, the third wall WL3*b*, and the fourth wall WL4*b* and further includes a fifth wall WL5*j*. The first wall WL1*b* is spaced from the second wall WL2*b* at the first direction to form the outer opening OT2. The third wall WL3*b*, which shields the outer opening OT2, is spaced from the second wall WL2*b* at the second direction. The third wall WL3*b* is spaced from the frame portion 151 and the fourth wall WL4*b* at the first direction to form an inner opening OI2 The first wall WL1*b* is parallel to the fourth wall WL4*b* and the fifth wall WL5*j*. The second wall WL2*b* is parallel to the third wall WL3*b*. The fifth wall WL5*j* is connected to a point of the second wall WL2*b* and the point is positioned between two opposite ends of the second wall WL2*b*. The first wall WL1*b* and the third wall WL3*b* are connected to one end of the frame portion 151. The fourth wall WL4*b* is connected between the second wall WL2*b* and the other end of the frame portion 151.

The boundary of the injection portion 1052 defining a channel path PTH10 is defined by the first wall WL1*b*, the second wall WL2*b* and the third wall WL3*b*, and the fourth wall WL4*b*. Although the first wall WL1*b* through the fifth wall WL5*j* are straight respectively, together they constitute the channel path PTH10 of bent geometry. The first wall WL1*b* is intersected with the third wall WL3*b* to form a first turn T1*b* of the channel path PTH10. The fourth wall WL4*b* is intersected with the second wall WL2*b* to form the second turn T2*b* of the channel path PTH10. Because the channel path PTH10 is bent, the effective length of the channel path PTH10 is essentially elongated and the end-seal 260 extends a relatively short length in the channel path PTH10. When the injection portion 1052 is applied to the display panel DP1 shown in FIG. 1A and FIG. 1B, the material of the display medium layer 140 that may interact with the material of the uncured end-seal 260 is restricted in the injection portion 1052 and the material of the display medium layer 140 spread in the second region 104 can mostly orient well. This eliminates or substantially reduces the end-seal mura of the display panel DP1, thereby ensuring display quality.

Figure 11:
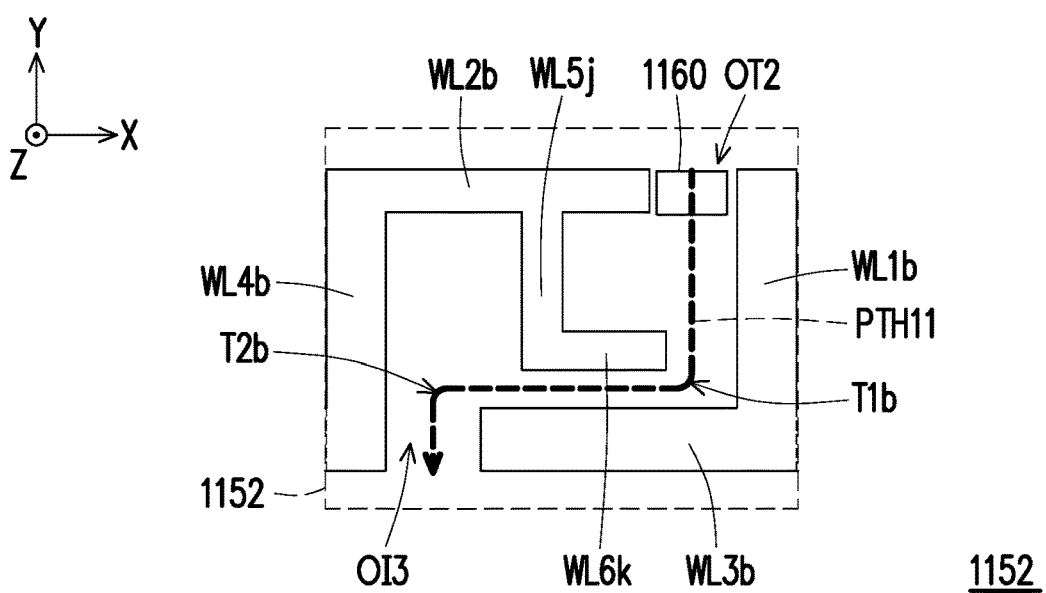

An injection portion 1152 shown in FIG. 11 is another exemplary alternative for replacing the injection portion 152 shown in FIG. 1A. As shown in FIG. 11, the injection portion 1152 is similar to the injection portion 1052 shown in FIG. 10. Compared to the injection portion 1052 shown in FIG. 10, the injection portion 1152 further includes a sixth wall WL6*k*. The second wall WL2*b* is parallel to the third wall WL3*b* and the sixth wall WL6*k*. The fifth wall WL5*j* is connected to the sixth wall WL6*k* and the second wall WL2*b*.

The boundary of the injection portion 1152 defining a channel path PTH11 is defined by the first wall WL1*b*, the second wall WL2*b* and the third wall WL3*b*, and the fourth wall WL4*b*. Although the first wall WL1*b* through the sixth wall WL6*k* are straight respectively, together they constitute the channel path PTH11 of bent geometry. The first wall WL1*b* is intersected with the third wall WL3*b* to form a first turn T1*b* of the channel path PTH11. The fourth wall WL4*b* is intersected with the second wall WL2*b* to form the second turn T2*b* of the channel path PTH11. Because the channel path PTH11 is bent, the effective length of the channel path PTH11 is essentially elongated and the end-seal 1160 extends a relatively short length in the channel path PTH11. When the injection portion 1152 is applied to the display panel DP1 shown in FIG. 1A and FIG. 1B, the material of the display medium layer 140 that may interact with the material of the uncured end-seal 1160 is restricted in the injection portion 1152 and the material of the display medium layer 140 spread in the second region 104 can mostly orient well. This eliminates or substantially reduces the end-seal mura of the display panel DP1, thereby ensuring display quality.

Figure 12:
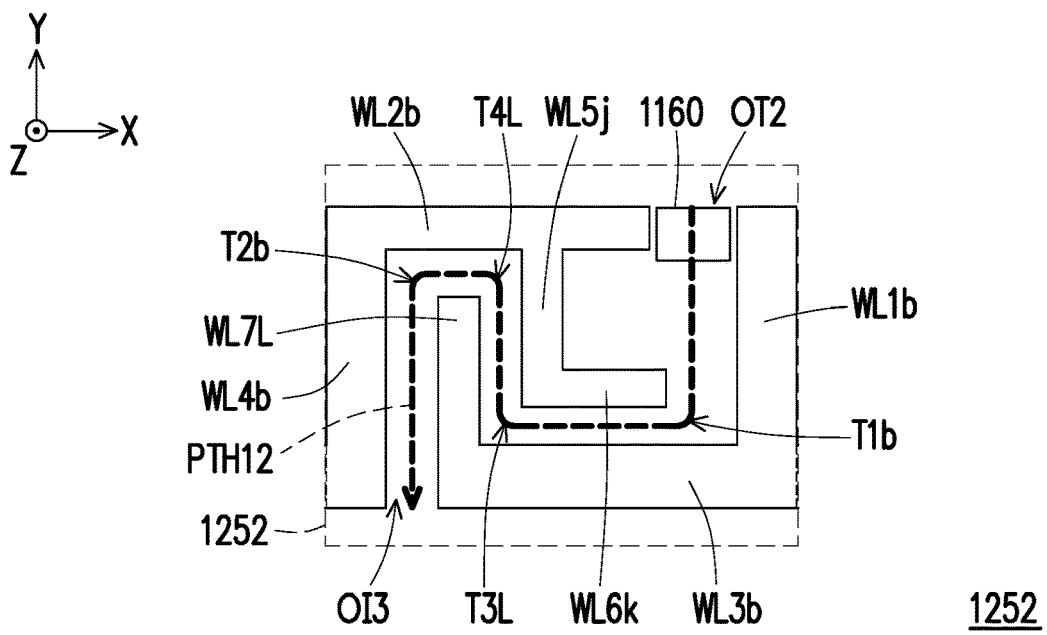

An injection portion 1252 shown in FIG. 12 is another exemplary alternative for replacing the injection portion 152 shown in FIG. 1A. As shown in FIG. 12, the injection portion 1252, similar to the injection portion 1152 in FIG. 11, includes the first wall WL1$b$, the second wall WL2$b$, the third wall WL3$b$, the fourth wall WL4$b$, the fifth wall WL5$j$, and the sixth wall WL6$k$ and further includes a seventh wall WL7L. The first wall WL1$b$ is parallel to the fourth wall WL4$b$, the fifth wall WL5$j$, and the seventh wall WL7L. The seventh wall WL7L is connected to the third wall WL3$b$.

The boundary of the injection portion 1252 defining a channel path PTH12 is defined by the first wall WL1$b$, the second wall WL2$b$ and the third wall WL3$b$, and the fourth wall WL4$b$. Although the first wall WL1$b$ through the seventh wall WL7L are straight respectively, together they constitute the channel path PTH12 of bent geometry. The first wall WL1$b$ is intersected with the third wall WL3$b$ to form a first turn T1$b$ of the channel path PTH12. The fourth wall WL4$b$ is intersected with the second wall WL2$b$ to form the second turn T2$b$ of the channel path PTH12. The seventh wall WL7L is intersected with the third wall WL3$b$ to form a third turn T3L of the channel path PTH12. The fifth wall WL5$j$ is intersected with the second wall WL2$b$ to form a fourth turn T4L of the channel path PTH12. Because the channel path PTH12 is bent, the effective length of the channel path PTH12 is essentially elongated and the end-seal 1160 extends a relatively short length in the channel path PTH12. When the injection portion 1252 is applied to the display panel DP1 shown in FIG. 1A and FIG. 1B, the material of the display medium layer 140 that may interact with the material of the uncured end-seal 1160 is restricted in the injection portion 1252 and the material of the display medium layer 140 spread in the second region 104 can mostly orient well. This eliminates or substantially reduces the end-seal mura of the display panel DP1, thereby ensuring display quality.

Figure 13:
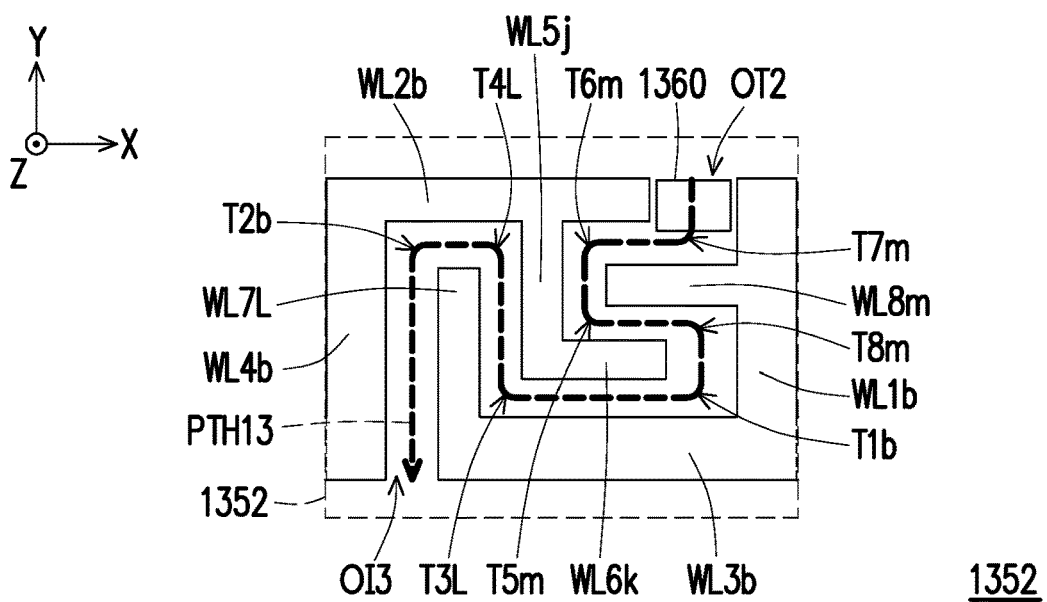

An injection portion 1352 shown in FIG. 13 is another exemplary alternative for replacing the injection portion 152 shown in FIG. 1A. As shown in FIG. 13, the injection portion 1352, similar to the injection portion 1252 in FIG. 12, includes the first wall WL1$b$, the second wall WL2$b$, the third wall WL3$b$, the fourth wall WL4$b$, the fifth wall WL5$j$, the sixth wall WL6$k$, and the seventh wall WL7L and further includes an eighth wall WL8$m$. The second wall WL2$b$ is parallel to the third wall WL3$b$, the sixth wall WL6$k$, and the eighth wall WL8$m$. The eighth wall WL8$m$ is connected to a point of the first wall WL1$b$ and the point is positioned between two opposite ends of the first wall WL1$b$.

The boundary of the injection portion 1352 defining a channel path PTH13 is defined by the first wall WL1$b$, the second wall WL2$b$ and the third wall WL3$b$, and the fourth wall WL4$b$. Although the first wall WL1$b$ through the eighth wall WL8$m$ are straight respectively, together they constitute the channel path PTH13 of bent geometry. The first wall WL1$b$ is intersected with the third wall WL3$b$ to form a first turn T1$b$ of the channel path PTH13. The fourth wall WL4$b$ is intersected with the second wall WL2$b$ to form the second turn T2$b$ of the channel path PTH13. The seventh wall WL7L is intersected with the third wall WL3$b$ to form the third turn T3L of the channel path PTH13. The fifth wall WL5$j$ is intersected with the second wall WL2$b$ to form the fourth turn T4L of the channel path PTH13. The sixth wall WL6$k$ is intersected with the fifth wall WL5$j$ to form a fifth turn T5$m$ of the channel path PTH13. The fifth wall WL5$j$ is intersected with the second wall WL2$b$ to form a sixth turn T6$m$ of the channel path PTH13. The eighth wall WL8$m$ is intersected with the first wall WL1$b$ to form a seventh turn T7$m$ and an eighth turn T8$m$ of the channel path PTH13. Because the channel path PTH13 is bent, the effective length of the channel path PTH13 is essentially elongated and the end-seal 1360 extends a relatively short length in the channel path PTH13. When the injection portion 1352 is applied to the display panel DP1 shown in FIG. 1A and FIG. 1B, the material of the display medium layer 140 that may interact with the material of the uncured end-seal 1360 is restricted in the injection portion 1352 and the material of the display medium layer 140 spread in the second region 104 can mostly orient well. This eliminates or substantially reduces the end-seal mura of the display panel DP1, thereby ensuring display quality.

Figure 14:
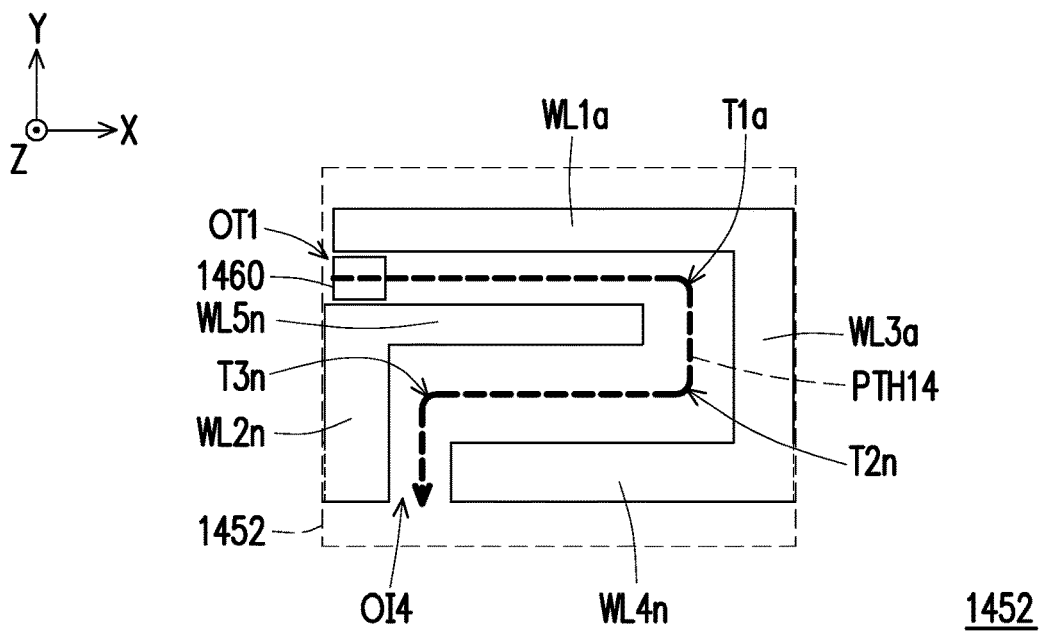

An injection portion 1452 shown in FIG. 14 is another exemplary alternative for replacing the injection portion 152 shown in FIG. 1A. As shown in FIG. 14, the injection portion 1452 includes the first wall WL1$a$, a second wall WL2$n$, the third wall WL3$a$, a fourth wall WL4$n$, and a fifth wall WL5$n$. Herein, the first wall WL1$a$ and the third wall WL3$a$ of the injection portion 1452 may be arranged in a similar manner as the first wall WL1$a$ and the third wall WL3$a$ of the injection portion 152 so that the same reference numbers are used for indicating the similar components. The first wall WL1$a$ is spaced from the second wall WL2$n$ at a first direction, for example, the Y direction, to form the outer opening OT1. The third wall WL3$a$, which shields the outer opening OT1, is spaced from the second wall WL2$n$ at a second direction, for example, the X direction. The fourth wall WL4$n$ is spaced from the frame portion 151 and the second wall WL2$n$ at the second direction to form an inner opening OI4.

The first wall WL1$a$ is parallel to the fourth wall WL4$n$, and the fifth wall WL5$n$. The second wall WL2$n$ is parallel to the third wall WL3$a$. The third wall WL3$a$ is connected between the first wall WL1$a$ and one end of the frame portion 151, and the third wall WL3$a$ and the fourth wall WL4$n$ are connected to the specific end of the frame portion 151. The second wall WL2$n$ is connected between the fifth wall WL5$n$ and the other end of the frame portion 151. An extension direction of the first wall WL1$a$ is intersected with an extension of the second wall WL2$n$ and the outer opening OT1 is formed between an end of the first wall WL1$a$ and an end of the second wall WL2$n$. The fifth wall WL5$n$ shields the inner opening OI4.

The boundary of the injection portion 1452 defining a channel path PTH14 is defined by the first wall WL1$a$, the second wall WL2$n$, the third wall WL3$a$, and the fourth wall WL4$n$. Although the first wall WL1$a$, the second wall WL2$n$ and the third wall WL3$a$, the fourth wall WL4$n$, and the fifth wall WL5$n$ are straight respectively, together they constitute the channel path PTH14 of bent geometry. The first wall WL1$a$ is intersected with the third wall WL3$a$ to form a first turn T1$a$ of the channel path PTH14. The fourth wall WL4$n$ is intersected with the third wall WL3$a$ to form a second turn T2$n$ of the channel path PTH14. The fifth wall WL5$n$ is intersected with the second wall WL2$n$ to form a third turn T3$n$ of the channel path PTH14. Because the channel path PTH14 is bent, the effective length of the channel path PTH14 is essentially elongated and the end-seal 1460 extends a relatively short length in the channel path PTH14. When the injection portion 1452 is applied to the display panel DP1 shown in FIG. 1A and FIG. 1B, the material of the display medium layer 140 that may interact with the material of the uncured end-seal 1460 is restricted in the injection portion 1452 and the material of the display medium layer 140 spread in the second region 104 can mostly orient well. This eliminates or substantially reduces the end-seal mura of the display panel DP1, thereby ensuring display quality.

Figure 15:
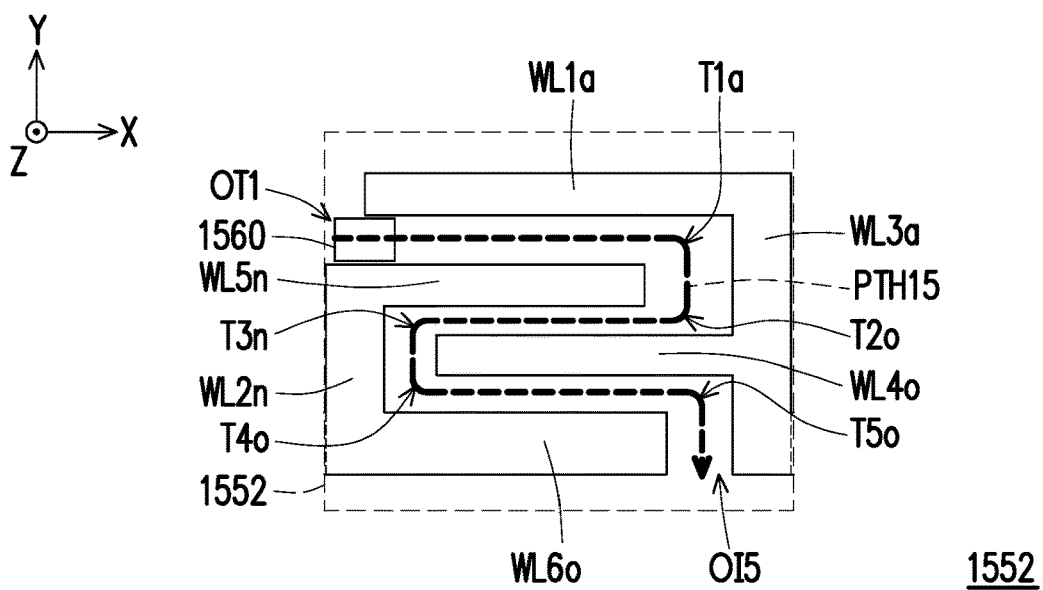

An injection portion 1552 is another exemplary alternative for replacing the injection portion 152 shown in FIG. 1A. As shown in FIG. 15, the injection portion 1552 includes the first wall WL1a, the second wall WL2n, the third wall WL3a, a fourth wall WL4o, the fifth wall WL5n, and a sixth wall WL6o. Herein, the first wall WL1a, the second wall WL2n, the third wall WL3a, and the fifth wall WL5n of the injection portion 1552 may be arranged in a similar manner as the first wall WL1a and the third wall WL3a of the injection portion 152 and the second wall WL2n and the fifth wall WL5n of the injection portion 1452 so that the same reference numbers are used for indicating the similar components. The first wall WL1a is spaced from the second wall WL2n at the first direction to form the outer opening OT1. The third wall WL3a, which shields the outer opening OT1, is spaced from the second wall WL2n at the second direction. The sixth wall WL6o is spaced from the frame portion 151 and the third wall WL3a at the second direction to form an inner opening OI5.

The first wall WL1a is parallel to the fourth wall WL4o, and the fifth wall WL5n, and the sixth wall WL6o. The second wall WL2n is parallel to the third wall WL3a. The third wall WL3a is connected between the first wall WL1a and one end of the frame portion 151. The fourth wall WL4o is connected to a point of the third wall WL3a and the point is positioned between two opposite ends of the third wall WL3a. The second wall WL2n is connected between the fifth wall WL5n and the sixth wall WL6o, and the second wall WL2n and the sixth wall WL6o are connected to the other end of the frame portion 151. An extension direction of the first wall WL1a is intersected with an extension of the second wall WL2n and the outer opening OT1 is formed between an end of the first wall WL1a and an end of the second wall WL2n. The fourth wall WL4o shields the inner opening OI5.

In the embodiment, a channel path PTH15 defined by the injection portion 1552 is alternate clockwise and counterclockwise twisted. The boundary of the injection portion 1552 is defined by the first wall WL1a, the second wall WL2n, the third wall WL3a, and the fourth wall WL4o. Although the first wall WL1a, the second wall WL2n and the third wall WL3a, the fourth wall WL4n, the fifth wall WL5n, and the sixth wall WL6o are straight respectively, together they constitute the channel path PTH15 of bent geometry. The first wall WL1a is intersected with the third wall WL3a to form a first turn T1a of the channel path PTH15. The fourth wall WL4o is intersected with the third wall WL3a to form a second turn T2o of the channel path PTH15. The fifth wall WL5n is intersected with the second wall WL2n to form a third turn T3n of the channel path PTH15. The second wall WL2n is intersected with the sixth wall WL6o to form a fourth turn T4o of the channel path PTH15. The fourth wall WL4o is intersected with the third wall WL3a to form a fifth turn T5o of the channel path PTH15. Because the channel path PTH15 is bent, the effective length of the channel path PTH15 is essentially elongated and the end-seal 1560 extends a relatively short length in the channel path PTH15. When the injection portion 1552 is applied to the display panel DP1 shown in FIG. 1A and FIG. 1B, the material of the display medium layer 140 that may interact with the material of the uncured end-seal 1560 is restricted in the injection portion 1552 and the material of the display medium layer 140 spread in the second region 104 can mostly orient well. This eliminates or substantially reduces the end-seal mura of the display panel DP1, thereby ensuring display quality.

Figure 16:
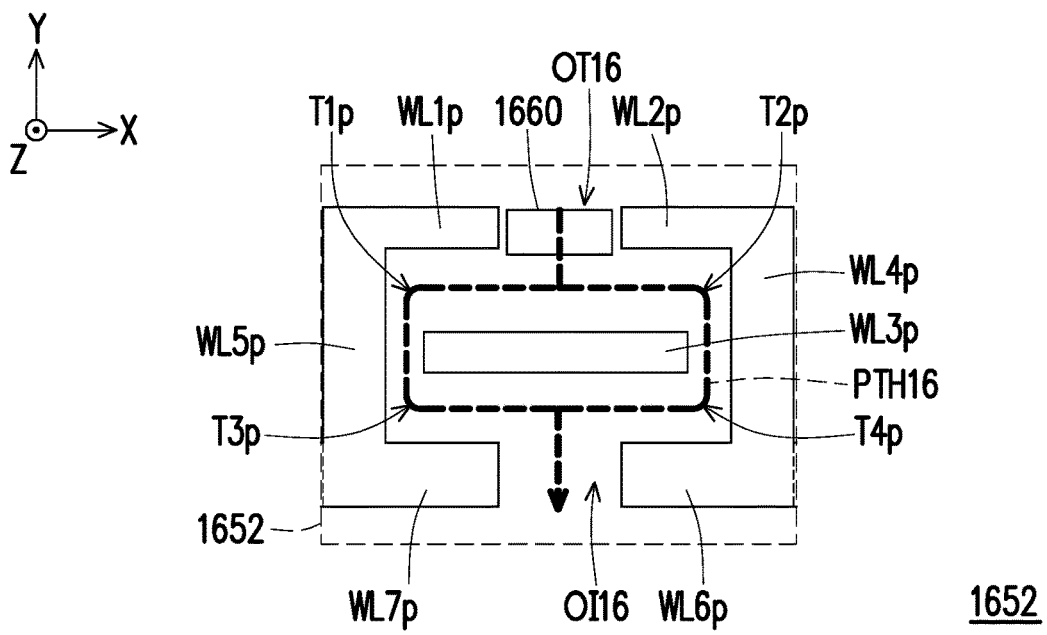

An injection portion 1652 shown in FIG. 16 is another exemplary alternative for replacing the injection portion 152 shown in FIG. 1A. As shown in FIG. 16, the injection portion 1652 includes a first wall WL1p, a second wall WL2p, a third wall WL3p, a fourth wall WL4p, a fifth wall WL5p, a sixth wall WL6p, and a seventh wall WL7p. The first wall WL1p is spaced from the second wall WL2p at a second direction, for example, the X direction, to form an outer opening OT16. The third wall WL3p, which shields the outer opening OT16, is spaced from the first wall WL1p and the second wall WL2p at a first direction, for example, the Y direction. The sixth wall WL6p is spaced from the seventh wall WL7p at the second direction to form an inner opening OI16. The third wall WL3p shields the inner opening OI16.

The third wall WL3p is parallel to the first wall WL1p and the second wall WL2p. A channel path PTH16 branches to a first portion between the first wall WL1p and the third wall WL3p and a second portion between the second wall WL2p and the third wall WL3p from the outer opening OT16. Similarly, the third wall WL3p is parallel to the sixth wall WL6p and the seventh wall WL7p. The channel path PTH16 branches to a third portion between the sixth wall WL6p and the third wall WL3p and a fourth portion between the seventh wall WL7p and the third wall WL3p from the inner opening OI16. The fourth wall WL4n is parallel to the fifth wall WL5n.

The fourth wall WL4p is connected between one end of the frame portion 151 and the second wall WL2p, and the fourth wall WL4p and the sixth wall WL6p are connected to the specific end of the frame portion 151. The fifth wall WL5p is connected between the other end of the frame portion 151 and the first wall WL1p, and the fifth wall WL5p and the seventh wall WL7p are connected to the specific end of the frame portion 151. The first wall WL1p, the second wall WL2p, the fourth wall WL4p, the fifth wall WL5p, the sixth wall WL6p, and the seventh wall WL7p surround the injection portion 1652. The third wall WL3p is spaced from first wall WL1p, the second wall WL2p, the fourth wall WL4p, the fifth wall WL5p, the sixth wall WL6p, and the seventh wall WL7p. In the embodiment, the third wall WL3p is isolated.

The boundary of the injection portion 1652 defining a channel path PTH16 is defined by the first wall WL1p, the second wall WL2p, the fourth wall WL4p, the fifth wall WL5p, the sixth wall WL6p, and the seventh wall WL7p. Although the first wall WL1p, the second wall WL2p, the fourth wall WL4p, the fifth wall WL5p, the sixth wall WL6p, and the seventh wall WL7p are straight respectively, together they constitute the channel path PTH16 of bent geometry. The first wall WL1p is intersected with the fifth wall WL5p to form a first turn T1p of the channel path PTH16. The second wall WL2p is intersected with the fourth wall WL4p to form a second turn T2p of the channel path PTH16. The fifth wall WL5p is intersected with the seventh wall WL7p to form a third turn T3p of the channel path PTH16. The fourth wall WL4p is intersected with the sixth wall WL6p to form a fourth turn T4p of the channel path PTH16. Because the channel path PTH16 is bent, the effective length of the channel path PTH16 is essentially elongated and the end-seal 1660 extends a relatively short length in the channel path PTH16. When the injection portion 1652 is applied to the display panel DP1 shown in FIG. 1A and FIG. 1B, the material of the display medium layer 140 that may interact with the material of the uncured end-seal 1660 is restricted in the injection portion 165 and the material of the display medium layer 140 spread in the second region 104 can mostly orient well. This eliminates or substantially reduces the end-seal mura of the display panel DP1, thereby ensuring display quality.

Figure 17:
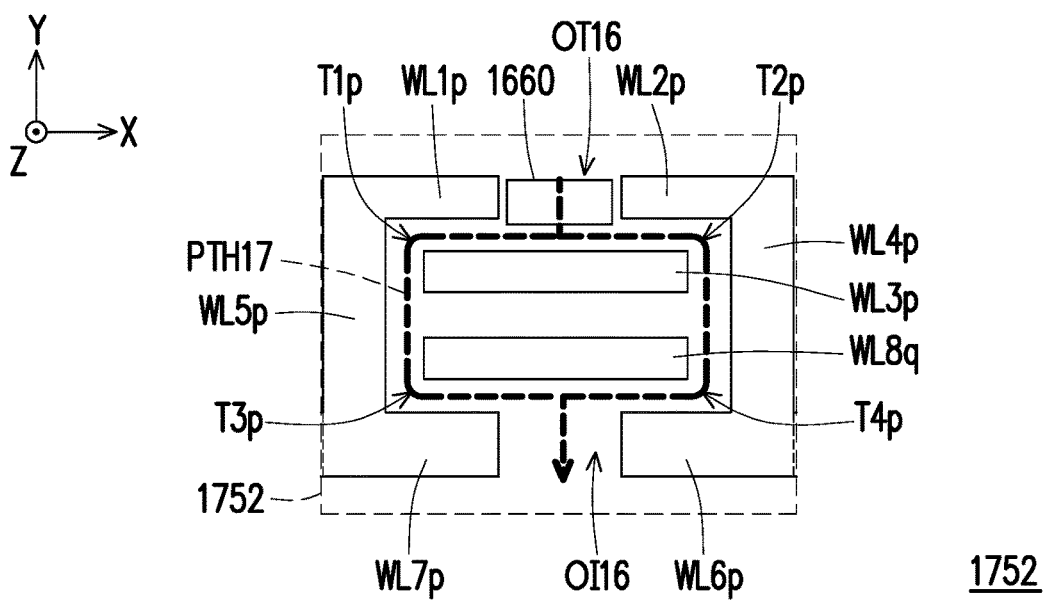

An injection portion 1752 shown in FIG. 17 is another exemplary alternative for replacing the injection portion 152 shown in FIG. 1A. As shown in FIG. 17, the injection portion 1752, similar to the injection portion 1652 in FIG. 16, the first wall WL1$p$, the second wall WL2$p$, the third wall WL3$p$, the fourth wall WL4$p$, the fifth wall WL5$p$, the sixth wall WL6$p$, and the seventh wall WL7$p$ and further includes an eighth wall WL8$q$. The eighth wall WL8$q$ is parallel to the third wall WL3$p$ and shields the inner opening OI16. The eighth wall WL8$q$ is parallel to the sixth wall WL6$p$ and the seventh wall WL7$p$. A channel path PTH17 branches to a third portion between the sixth wall WL6$p$ and the eighth wall WL8$q$ and a fourth portion between the seventh wall WL7$p$ and the eighth wall WL8$q$ from the inner opening OI16. The third wall WL3$p$ and the eighth wall WL8$q$ are spaced from first wall WL1$p$, the second wall WL2$p$, the fourth wall WL4$p$, the fifth wall WL5$p$, the sixth wall WL6$p$, and the seventh wall WL7$p$. The third wall WL3$p$ and the eighth wall WL8$q$ are positioned inside a region surrounded by the first wall WL1$p$, the second wall WL2$p$, the fourth wall WL4$p$, the fifth wall WL5$p$, the sixth wall WL6$p$, and the seventh wall WL7$p$ and spaced from each other at the first direction, the Y direction. In the embodiment, the third wall WL3$p$ and the eighth wall WL8$q$ are isolated.

The boundary of the injection portion 1752 defining the channel path PTH17 is defined by the first wall WL1$p$, the second wall WL2$p$, the fourth wall WL4$p$, the fifth wall WL5$p$, the sixth wall WL6$p$, and the seventh wall WL7$p$. The first wall WL1$p$ is intersected with the fifth wall WL5$p$ to form the first turn T1$p$ of the channel path PTH17. The second wall WL2$p$ is intersected with the fourth wall WL4$p$ to form the second turn T2$p$ of the channel path PTH17. The fifth wall WL5$p$ is intersected with the seventh wall WL7$p$ to form the third turn T3$p$ of the channel path PTH17. The fourth wall WL4$p$ is intersected with the sixth wall WL6$p$ to form the fourth turn T4$p$ of the channel path PTH17. Although the first wall WL1$p$ through the eighth wall WL8$q$ are straight respectively, together they constitute the channel path PTH17 of bent geometry. Because the channel path PTH17 is bent, the effective length of the channel path PTH17 is essentially elongated and the end-seal 1660 extends a relatively short length in the channel path PTH17. When the injection portion 1752 is applied to the display panel DP1 shown in FIG. 1A and FIG. 1B, the material of the display medium layer 140 that may interact with the material of the uncured end-seal 1660 is restricted in the injection portion 1752 and the material of the display medium layer 140 spread in the second region 104 can mostly orient well. This eliminates or substantially reduces the end-seal mura of the display panel DP1, thereby ensuring display quality.

Figure 18:
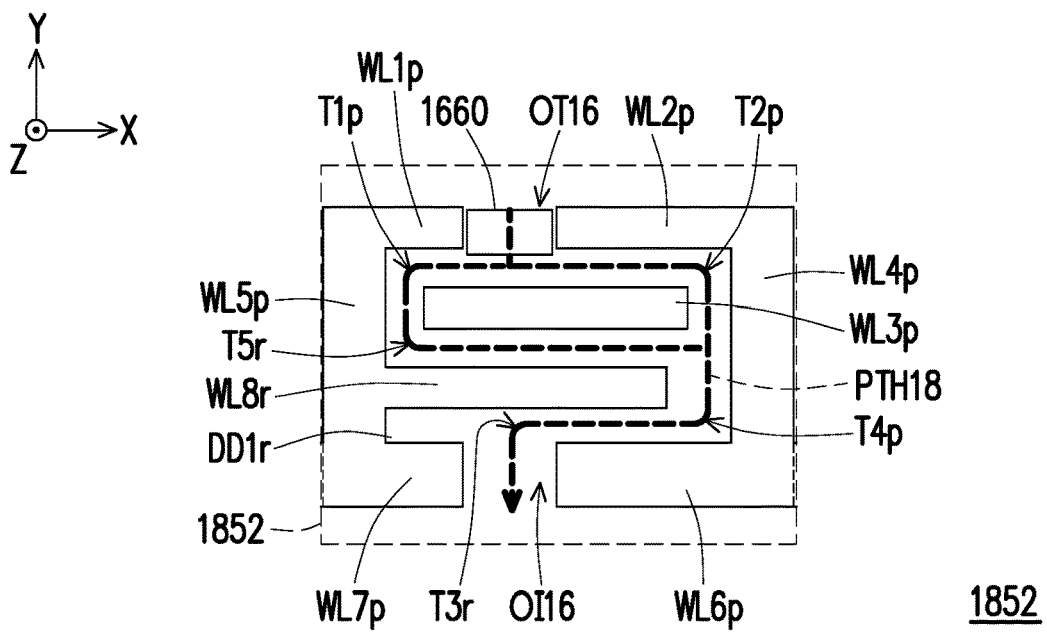

An injection portion 1852 shown in FIG. 18 is another exemplary alternative for replacing the injection portion 152 shown in FIG. 1A. As shown in FIG. 18, the injection portion 1852, similar to the injection portion 1652 in FIG. 16, the first wall WL1$p$, the second wall WL2$p$, the third wall WL3$p$, the fourth wall WL4$p$, the fifth wall WL5$p$, the sixth wall WL6$p$, and the seventh wall WL7$p$ and further includes an eighth wall WL8$r$. The eighth wall WL8$r$ is parallel to the third wall WL3$p$ and shields the inner opening OI16. The eighth wall WL8$r$ is parallel to the sixth wall WL6$p$ and the seventh wall WL7$p$. The channel path PTH18 branches to a third portion between the sixth wall WL6$p$ and the eighth wall WL8$r$ and a fourth portion between the seventh wall WL7$p$ and the eighth wall WL8$r$ from the inner opening OI16. The eighth wall WL8$r$ is connected to the fifth wall WL5$p$ and spaced from the fourth wall WL4$p$. The eighth wall WL8$r$ is connected to a point of the fifth wall WL5$p$ and the point is positioned between two opposite ends of the fifth wall WL5$p$. Together the eighth wall WL8$r$, the fifth wall WL5$p$ and the seventh wall WL7$p$ form a dead end DD1$r$ of the channel path PTH18.

The boundary of the injection portion 1852 defining a channel path PTH18 is defined by the first wall WL1$p$, the second wall WL2$p$, the fourth wall WL4$p$, the fifth wall WL5$p$, the sixth wall WL6$p$, and the seventh wall WL7$p$. Although the first wall WL1$p$ through the eighth wall WL8$r$ are straight respectively, together they constitute the channel path PTH18 of bent geometry. The first wall WL1$p$ is intersected with the fifth wall WL5$p$ to form a first turn T1$p$ of the channel path PTH18. The second wall WL2$p$ is intersected with the fourth wall WL4$p$ to form a second turn T2$p$ of the channel path PTH18. The fifth wall WL5$p$ is intersected with the eighth wall WL8$r$ to form a third turn T3$r$ of the channel path PTH18. The fourth wall WL4$p$ is intersected with the sixth wall WL6$p$ to form a fourth turn T4$p$ of the channel path PTH18. The fifth wall WL5$p$ is intersected with the eighth wall WL8$r$ to form a fifth turn T5$r$ of the channel path PTH18. Because the channel path PTH18 is bent, the effective length of the channel path PTH18 is essentially elongated and the end-seal 1660 extends a relatively short length in the channel path PTH18. When the injection portion 1852 is applied to the display panel DP1 shown in FIG. 1A and FIG. 1B, the material of the display medium layer 140 that may interact with the material of the uncured end-seal 1660 is restricted in the injection portion 1852 and the material of the display medium layer 140 spread in the second region 104 can mostly orient well. This eliminates or substantially reduces the end-seal mura of the display panel DP1, thereby ensuring display quality.

Figure 19:
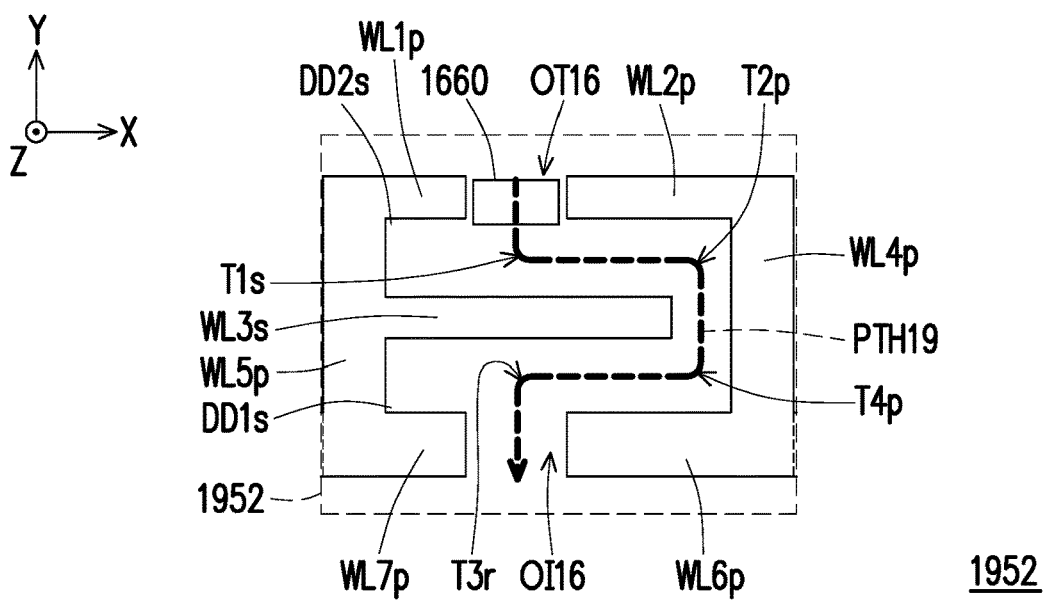

An injection portion 1952 shown in FIG. 19 is another exemplary alternative for replacing the injection portion 152 shown in FIG. 1A. As shown in FIG. 19, the injection portion 1952 includes the first wall WL1$p$, the second wall WL2$p$, a third wall WL3$s$, the fourth wall WL4$p$, the fifth wall WL5$p$, the sixth wall WL6$p$, and the seventh wall WL7$p$. Herein, the first wall WL1$p$, the second wall WL2$p$, the fourth wall WL4$p$, the fifth wall WL5$p$, the sixth wall WL6$p$, and the seventh wall WL7$p$ may be arranged in a similar manner as the first wall WL1$p$, the second wall WL2$p$, the fourth wall WL4$p$, the fifth wall WL5$p$, the sixth wall WL6$p$, and the seventh wall WL7$p$ of the injection portion 1652 so that the same reference numbers are used for indicating the similar components. The third wall WL3$s$, which shields the outer opening OT16 and the inner opening OI16, is spaced from the first wall WL1$p$ and the second wall WL2$p$ at the first direction, the Y direction.

The third wall WL3$s$ is parallel to the first wall WL1$p$ and the second wall WL2$p$. A channel path PTH19 branches to a first portion between the first wall WL1$p$ and the third wall WL3$s$ and a second portion between the second wall WL2$p$ and the third wall WL3$s$ from the outer opening OT16. Similarly, the third wall WL3$s$ is parallel to the sixth wall WL6$p$ and the seventh wall WL7$p$. The channel path PTH19 branches to a third portion between the sixth wall WL6$p$ and the third wall WL3s and a fourth portion between the seventh wall WL7p and the third wall WL3s from the inner opening OI16. The third wall WL3s is connected to the fifth wall WL5p and spaced from the fourth wall WL4p. The third wall WL3s is connected to a point of the fifth wall WL5p and the point is positioned between two opposite ends of the fifth wall WL5p. Together the third wall WL3s, the fifth wall WL5p and the seventh wall WL7p form a dead end DD1s of the channel path PTH19. Together the first wall WL1p, the third wall WL3s, and the fifth wall WL5p form a dead end DD2s of the channel path PTH19.

The boundary of the injection portion 1952 defining a channel path PTH19 is defined by the first wall WL1p, the second wall WL2p, the fourth wall WL4p, the fifth wall WL5p, the sixth wall WL6p, and the seventh wall WL7p. Although the first wall WL1p, the second wall WL2p, the third wall WL3s, the fourth wall WL4p, the fifth wall WL5p, the sixth wall WL6p, and the seventh wall WL7p are straight respectively, together they constitute the channel path PTH19 of bent geometry. The third wall WL3s is intersected with the fifth wall WL5p to form a first turn T1s of the channel path PTH19. The second wall WL2p is intersected with the fourth wall WL4p to form a second turn T2p of the channel path PTH19. The fifth wall WL5p is intersected with the seventh wall WL7p to form a third turn T3r of the channel path PTH19. The fourth wall WL4p is intersected with the sixth wall WL6p to form the fourth turn T4p of the channel path PTH19. Because the channel path PTH19 is bent, the effective length of the channel path PTH19 is essentially elongated and the end-seal 1660 extends a relatively short length in the channel path PTH19. When the injection portion 1952 is applied to the display panel DP1 shown in FIG. 1A and FIG. 1B, the material of the display medium layer 140 that may interact with the material of the uncured end-seal 1660 is restricted in the injection portion 1952 and the material of the display medium layer 140 spread in the second region 104 can mostly orient well. This eliminates or substantially reduces the end-seal mura of the display panel DP1, thereby ensuring display quality.

Figure 20:
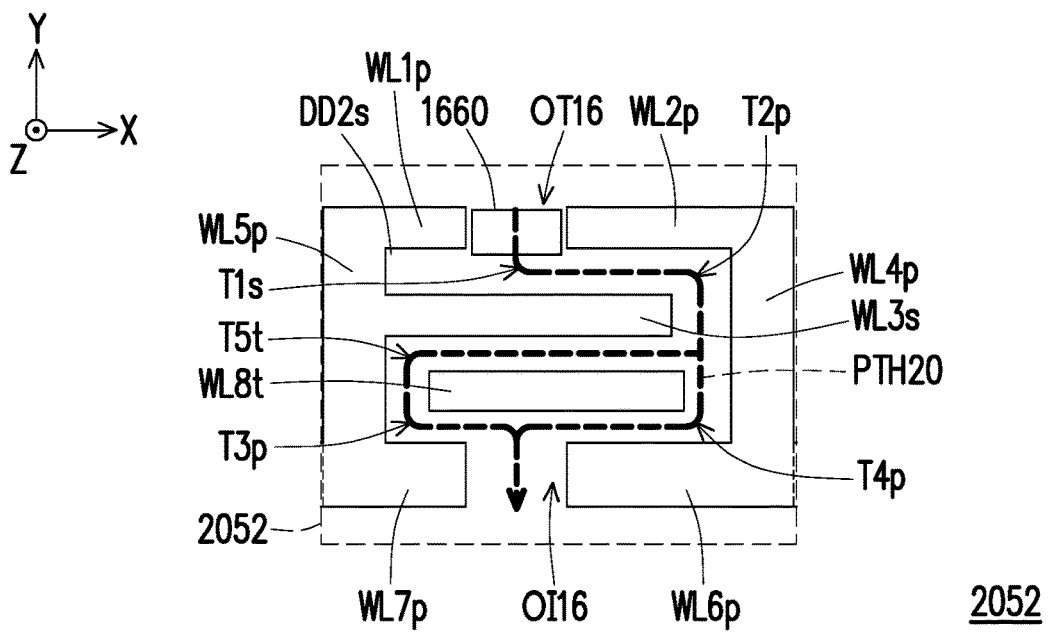

An injection portion 2052 shown in FIG. 20 is another exemplary alternative for replacing the injection portion 152 shown in FIG. 1A. As shown in FIG. 20, the injection portion 2052 is similar to the injection portion 1952 in FIG. 19 and further includes an eighth wall WL8t. The eighth wall WL8t is parallel to the third wall WL3s and shields the inner opening OI16. The eighth wall WL8t is parallel to the sixth wall WL6p and the seventh wall WL7p. A channel path PTH20 branches to a third portion between the sixth wall WL6p and the eighth wall WL8t and a fourth portion between the seventh wall WL7p and the eighth wall WL8t from the inner opening OI16. The eighth wall WL8t are spaced from first wall WL1p, the second wall WL2p, the third wall WL3s, the fourth wall WL4p, the fifth wall WL5p, the sixth wall WL6p, and the seventh wall WL7p. In the embodiment, the eighth wall WL8t is isolated.

The boundary of the injection portion 2052 defining the channel path PTH20 is defined by the first wall WL1p, the second wall WL2p, the fourth wall WL4p, the fifth wall WL5p, the sixth wall WL6p, and the seventh wall WL7p. Although the first wall WL1p through the eighth wall WL8t are straight respectively, together they constitute the channel path PTH20 of bent geometry. The third wall WL3s is intersected with the fifth wall WL5p to form the first turn T1s of the channel path PTH20. The second wall WL2p is intersected with the fourth wall WL4p to form the second turn T2p of the channel path PTH20. The fifth wall WL5p is intersected with the seventh wall WL7p to form the third turn T3p of the channel path PTH20. The fourth wall WL4p is intersected with the sixth wall WL6p to form the fourth turn T4p of the channel path PTH20. The fifth wall WL5p is intersected with the third wall WL3s to form a fifth turn T5t of the channel path PTH18. Because the channel path PTH20 is bent, the effective length of the channel path PTH20 is essentially elongated and the end-seal 1660 extends a relatively short length in the channel path PTH20. When the injection portion 2052 is applied to the display panel DP1 shown in FIG. 1A and FIG. 1B, the material of the display medium layer 140 that may interact with the material of the uncured end-seal 1660 is restricted in the injection portion 2052 and the material of the display medium layer 140 spread in the second region 104 can mostly orient well. This eliminates or substantially reduces the end-seal mura of the display panel DP1, thereby ensuring display quality.

Figure 21:
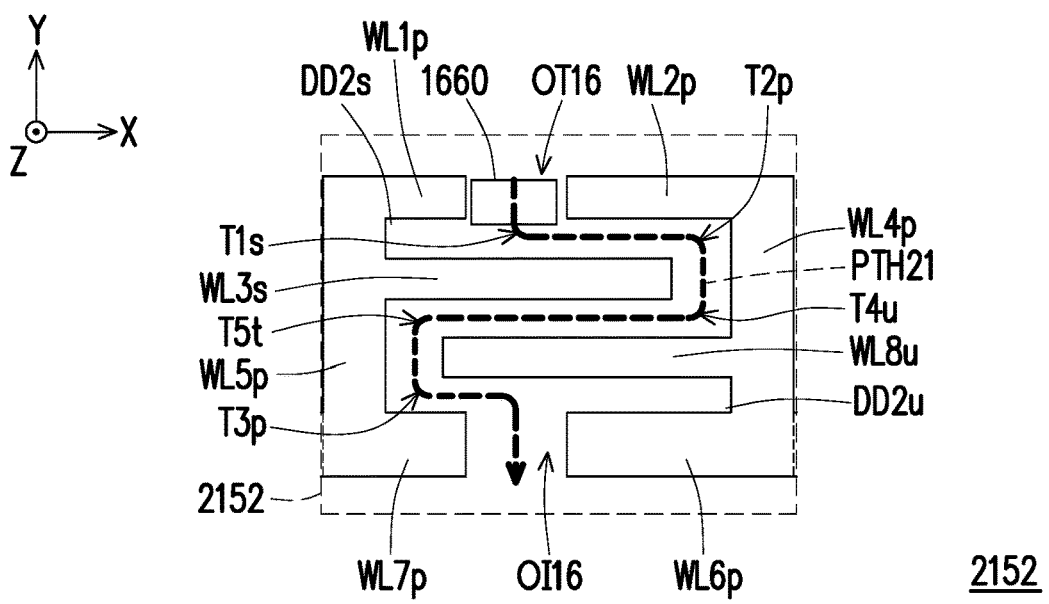

An injection portion 2152 shown in FIG. 21 is another exemplary alternative for replacing the injection portion 152 shown in FIG. 1A. As shown in FIG. 21, the injection portion 2152 is similar to the injection portion 1952 and further includes an eighth wall WL8u. The eighth wall WL8u is parallel to the third wall WL3s and shields the inner opening OI16. The eighth wall WL8u is parallel to the sixth wall WL6p and the seventh wall WL7p. A channel path PTH21 branches to a third portion between the sixth wall WL6p and the eighth wall WL8u and a fourth portion between the seventh wall WL7p and the eighth wall WL8u from the inner opening OI16. The eighth wall WL8u is connected to the fourth wall WL4p and spaced from the fifth wall WL5p. Moreover, the third wall WL3s is connected to the fifth wall WL5p while the eighth wall WL8u is connected to the fourth wall WL4p. The eighth wall WL8u is connected to a point of the fourth wall WL4p and the point is positioned between two opposite ends of the fourth wall WL4p. Together the second wall WL2p, the fourth wall WL4p, and the eighth wall WL8u form a dead end DD2u of the channel path PTH21.

In the embodiment, a channel path PTH21 of the injection portion 2152 is alternate clockwise and counterclockwise twisted. The boundary of the injection portion 2152 defined by the first wall WL1p, the second wall WL2p, the fourth wall WL4p, the fifth wall WL5p, the sixth wall WL6p, and the seventh wall WL7p. Although the first wall WL1p through the eighth wall WL8u are straight respectively, together they constitute the channel path PTH21 of bent geometry. The third wall WL3s is intersected with the fifth wall WL5p to form the first turn T1s of the channel path PTH21. The second wall WL2p is intersected with the fourth wall WL4p to form the second turn T2p of the channel path PTH21. The fifth wall WL5p is intersected with the seventh wall WL7p to form the third turn T3p of the channel path PTH21. The fourth wall WL4p is intersected with the eighth wall WL8u to form a fourth turn T4u of the channel path PTH21. The fifth wall WL5p is intersected with the third wall WL3s to form the fifth turn T5t of the channel path PTH21. Because the channel path PTH21 is bent, the effective length of the channel path PTH21 is essentially elongated and the end-seal 1660 extends a relatively short length in the channel path PTH21. When the injection portion 2152 is applied to the display panel DP1 shown in FIG. 1A and FIG. 1B, the material of the display medium layer 140 that may interact with the material of the uncured end-seal 1660 is restricted in the injection portion 2152 and the material of the display medium layer 140 spread in the second region 104 can mostly orient well. This eliminates or substantially reduces the end-seal mura of the display panel DP1, thereby ensuring display quality.

In summary, the channel path of the injection portion of the sealant is bent so as to elongate its effective length. Compared to the effective length of the channel path of the injection portion, the end-seal extends in the channel path for a relatively short length and close the outer opening of the channel path. The material of the display medium layer can interact with the uncured material of the end-seal, and if the interaction occurs, it may be restricted in the channel path defined by the injection portion. Without the influence of the end-seal, the liquid crystal molecules spread in the display region can mostly orient well. This eliminates or substantially reduces the end-seal mura of the display panel, thereby improving the quality of the display panel.

It will be apparent to those skilled in the art that various modifications and variations can be made to the disclosed embodiments without departing from the scope or spirit of the disclosure. In view of the foregoing, it is intended that the disclosure covers modifications and variations provided that they fall in the scope of the following claims and their equivalents.

What is claimed is:

1. A display panel, comprising:
    a top substrate;
    a bottom substrate;
    a display medium layer disposed between the top substrate and the bottom substrate; and
    a sealant comprises:
        a frame portion surrounding a region and the display medium layer distributing in the region; and
        an injection portion connected to the frame portion, the injection portion having a channel path, an inner opening and an outer opening, the channel path communicated to the region at the inner opening, and the outer opening being at a distal end of the channel path away from the region, wherein the injection portion comprises a first wall, a second wall and a third wall, the first wall is spaced from the second wall at a first direction to form the outer opening and the third wall is spaced from the second wall at a second direction and shields the outer opening, and the first direction is intersected with the second direction,
    wherein the first wall is intersected with the third wall to form a first turn of the channel path,
    wherein the third wall is spaced from the frame portion at the first direction to form the inner opening.

2. The display panel according to claim 1, wherein an extension direction of the first wall is intersected with an extension of the second wall and the outer opening is formed between an end of the first wall and an end of the second wall.

3. The display panel according to claim 1, wherein the first wall and the third wall are connected to the frame portion.

4. The display panel according to claim 3, wherein the third wall is connected to an end of the first wall.

5. The display panel according to claim 1, wherein the third wall is connected to a point of the first wall and the point is positioned between two opposite ends of the first wall.

6. The display panel according to claim 1, wherein the third wall shields the inner opening.

7. The display panel according to claim 1, wherein the third wall is connected between the first wall and the frame portion.

8. The display panel according to claim 1, wherein the sealant further comprises a fourth wall, the fourth wall is intersected with the third wall to form a second turn of the channel path.

9. The display panel according to claim 8, wherein the fourth wall is spaced from the frame portion at the first direction to form the inner opening.

10. The display panel according to claim 8, wherein the fourth wall is connected to the third wall.

11. The display panel according to claim 1, wherein the first wall is parallel to the second wall.

12. The display panel according to claim 1, wherein the sealant further comprises a fourth wall and a fifth wall, the fourth wall is connected between the frame portion and the first wall, the fifth wall is connected between the frame portion and the second wall, wherein the first wall, the second wall, the fourth wall and the fifth wall surrounds the injection portion.

13. The display panel according to claim 12, wherein the third wall is spaced from the first, the second, the fourth, and the fifth walls.

14. The display panel according to claim 12, wherein the third wall is connected to one of the fourth wall and the fifth wall and spaced from the other of the fourth wall and the fifth wall.

15. The display panel according to claim 12, wherein further comprising a sixth wall, wherein the sixth wall and the third wall are positioned inside a region surrounded by the first, the second, the fourth, and the fifth walls and spaced from each other at the second direction.

16. The display panel according to claim 15, wherein the sixth wall and the third wall are spaced from the first, the second, the fourth, and the fifth walls.

17. The display panel according to claim 15, wherein the third wall is connected to one of the fourth wall and the fifth wall and the sixth wall is connected to the other of the fourth wall and the fifth wall.

18. The display panel according to claim 1, wherein the second wall is spaced from the third wall at the second direction to form the inner opening.

19. The display panel according to claim 1, wherein the third wall is parallel to the first wall and the second wall, and the channel path branches to a first portion between the first wall and the third wall and a second portion between the first wall and the third wall from the outer opening.

* * * * *